United States Patent
Gans et al.

(12)

(10) Patent No.: US 6,216,127 B1
(45) Date of Patent: Apr. 10, 2001

(54) METHOD AND APPARATUS FOR PROCESSING ELECTRONIC MAIL IN PARALLEL

(75) Inventors: Stevens S. Gans, San Francisco; Farzad Nazem, Redwood City, both of CA (US)

(73) Assignee: Oracle Corporation, Redwood City, CA (US)

( * ) Notice: Subject to any disclaimer, the term of this patent is extended or adjusted under 35 U.S.C. 154(b) by 0 days.

(21) Appl. No.: 09/154,523

(22) Filed: Sep. 16, 1998

Related U.S. Application Data

(63) Continuation of application No. 08/939,998, filed on Sep. 29, 1997, now Pat. No. 5,835,762, which is a continuation of application No. 08/660,737, filed on Jun. 6, 1996, now abandoned, which is a continuation of application No. 08/465,734, filed on Jun. 6, 1995, now abandoned, which is a continuation of application No. 08/751,159, filed on Feb. 22, 1994, now Pat. No. 5,504,897.

(51) Int. Cl.[7] ............................. G06F 17/30; G06F 15/16

(52) U.S. Cl. ........................... 707/10; 707/103; 709/206; 709/207

(58) Field of Search ............................ 707/10, 103, 104; 709/206, 207, 100; 714/48; 706/47

(56) References Cited

U.S. PATENT DOCUMENTS

| 4,084,228 | 4/1978 | Dufond et al. ........................ 364/200 |
| 4,796,178 | 1/1989 | Jennings et al. ...................... 364/200 |
| 4,805,134 | 2/1989 | Calo et al. ............................ 364/900 |
| 4,896,290 | 1/1990 | Rhodes et al. ........................ 364/521 |
| 5,093,918 | 3/1992 | Heyen et al. ......................... 395/725 |
| 5,138,653 | 8/1992 | Le Clerq . | |

(List continued on next page.)

OTHER PUBLICATIONS

Dr. Thomas, Rebecca, "Writing to the Net, Killing Processing By Name", Unix World, p. 137; vol. VIII, No. 11., Nov. 1991.

Rochkind, Marc J., "Advanced Unix Programming", Prentice–Hall, pp. 6, 7, 219, 220, 1985.

Reiss, Levi, *Unix System Administration Guide*, Osborne Mcgraw Hill 1993, pp. 424, 425, 82, 91.

Reinhardt, Andy, *Smarter E–Mail IS Coming*, Mar. 1993, Byte Magazine Cover Story, p. 90–94, 96–98, 100–102, 105–108, 136–140, 142–148, 150–154.

(List continued on next page.)

*Primary Examiner*—Thomas G. Black
*Assistant Examiner*—Frantz Coby
(74) *Attorney, Agent, or Firm*—Hickman, Palermo, Truong & Becker, LLP

(57) ABSTRACT

The present invention provides a method and apparatus for processing electronic mail in parallel. The present invention provides the ability to process mail objects in an electronic mail system in parallel. A message can be assigned to a queue. One or more processes can manage a plurality of messages in the queue. Each process can identify the next entry to be processed. Entries previously processed can be marked such that subsequent access is locked out. Mail objects and process information can be stored in a relational database system that provides the ability to perform locking at the record level. A process can be configured to perform a plurality of activities in a plurality of time periods. A guardian process can initiate or terminate other processes based on process information. Further, a guardian process examines system information periodically and identifies any need to initiate, restart, or stop one or more processes. Further, the guardian process can pass process information to an initiated process. One or more tables can be used to retain message information such as a instance table that includes a queue column. Further, tables can be used to retain process information such as process, process parameters, and process time tables.

14 Claims, 24 Drawing Sheets

U.S. PATENT DOCUMENTS

| | | |
|---|---|---|
| 5,177,680 | 1/1993 | Tsukino et al. . |
| 5,245,532 | 9/1993 | Mourier . |
| 5,278,984 | 1/1994 | Batchelor . |
| 5,283,856 | 2/1994 | Gross et al. . |
| 5,325,310 | 6/1994 | Johnson et al. . |
| 5,333,266 | 7/1994 | Boaz et al. . |
| 5,394,549 | 2/1995 | Stringfellow et al. . |
| 5,404,501 | 4/1995 | Carr et al. . |
| 5,406,557 | 4/1995 | Baudoin . |
| 5,481,689 * | 1/1996 | Itoh et al. .............................. 714/48 |
| 5,487,100 | 1/1996 | Kane . |
| 5,504,897 * | 4/1996 | Gans et al. ........................... 707/104 |
| 5,627,764 * | 5/1997 | Schutzman et al. ................. 709/207 |
| 5,802,253 * | 9/1998 | Gross et al. ........................... 706/47 |
| 5,835,762 * | 10/1998 | Gans et al. ........................... 709/100 |

OTHER PUBLICATIONS

Meyer, Steve, "Tuning Your Netware 3.11 Serveri Key Parameters for Internal Management", Lan Times Jan. 24, 1994; p. 25, 27; vol. 11, Issue 2.

Stevens, Richard W., "Advanced Programming in the Unix Environment", Addison–Wesley, 1992, pp. 187–236.

* cited by examiner

PROCESS PARAMETERS TABLE 1352

| classId 1354 | instanceId 1356 | parameter 1358 | valueNum 1360 | valueChar 1362 | valueDate 1364 |
|---|---|---|---|---|---|

METHOD AND APPARATUS FOR PROCESSING ELECTRONIC MAIL IN PARALLEL

RELATED APPLICATIONS

This application is a continuation of U.S. application Ser. No. 08/939,998, filed Sep. 29, 1997 issued Nov. 10, 1998 as U.S. Pat. No. 5,835,762, which is a continuation of application Ser. No. 08/660,737, filed Jun. 6, 1996, now abandoned, which is a continuation of application Ser. No. 08/465,734, filed Jun. 6, 1995, now abandoned, which is a continuation of application Ser. No. 08/175,159, filed Dec. 28, 1993, issued Apr. 2, 1996 as U.S. Pat. No. 5,504,897.

BACKGROUND OF THE INVENTION

1. Field of the Invention

This invention relates to the field of parallel processing in an electronic mail environment.

2. Background Art

Electronic mail messaging provides the ability to communicate information throughout an enterprise (e.g., send and receive messages and files between enterprise users). Electronic mail users can send, for example, mail messages, scheduling messages, directory information, and files.

Electronic mail systems provide the ability to perform mail operations. For example, electronic mail operations include the ability to send and receive messages (i.e., mail or calendar scheduling messages directory information, and/or files). Messages received by a user can be, for example, read and/or forwarded to another mail user. Further, a user can send a reply message to the sending user. Other operations may be provided to manage messages and files.

Messages in a electronic mail systems can be grouped, or queued, based on some like characteristic (e.g., the type of further processing required). For example, a submission queue can contain messages targeted for a particular location. A rerouting queue can be used to store messages that need to be routed to another location. A notification queue can contain a list of messages that have been placed in a user's incoming mail box, and for which users are to receive notification. A dead message queue can be used to identify messages that are not deliverable or returnable to the sender. A garbage collection queue can be used to contain messages that can be removed from a system. Remote queues contain messages bound for remote locations. Gateway queues contain messages destined for foreign messaging environments.

As the number of mail users increases, the number of messages to be processed by a mail system typically increases. Conversely, as the number of mail users decreases, the number of messages decreases. If, for example, messaging increases and processing capability to handle messaging remains constant, the number of messages in the message queues such as the ones discussed above can increase. Prior art systems provide the ability to serially process messages, or queue entries. However, these systems do not provide the ability to scale processing (up or down) to accommodate a change in messaging activity.

SUMMARY OF THE INVENTION

The present invention provides the ability to scale an electronic mail system. The present invention provides the ability to process mail entries in parallel to accommodate increased messaging activity. Further, the present invention provides the ability to down scale processing capability to accommodate decreases in messaging activity.

The present invention provides the ability to scale a queue such that a queue can be generic and have one or more processes manage a portion of messages in the queue. Instead of assigning a message to a particular process, a message can be assigned to a queue. Further, multiple processes can be assigned to process a queue. Thus, as more activity causes the number of entries in a queue to increase, additional processes can be assigned to process the queue's entries. Similarly, as activity decreases and the number of queue entries decrease, the processing capability assigned to a queue can be decreased.

Each process can identify the next entry to be processed, and then process the entry. Entries previously processed can be marked such that processes that subsequently access the entry are aware that the entry has been processed. Any order for entry selection can be used. For example, queue entries can be placed in the queue in the order in which they are received. Further, priorities can be assigned to queue entries. Thus, for example, each process can select queue entries on a First In First Out (FIFO) basis. Further, the FIFO selection can be varied based on the priorities assigned to the queue entries.

Any method can be used to identify queue entries previously or currently being processed by one process. In the preferred embodiment, messaging and process information are stored in a relational database system that provides the ability to perform locking at the record level. Such a relational database management system (RDBMS) is provided by Oracle Corporation. Messaging and process information are stored in relations, or tables, in the RDBMS.

A process can be used to perform multiple tasks or activities. Each process can be configured to perform one or more of these activities. Further, processes can be configured to run during a certain time period. Thus, for example, multiple processes can be configured to perform garbage collection. A garbage collector process can be further configured to, for example, clean up mail messages or scheduler messages, or clean up replication or directory registration information. Further, a garbage collector can be run at night to perform garbage collection on mail messages. Another garbage collector can be run during the daytime to perform garbage collection tasks.

The number and type of processes can be determined or altered by a electronic mail system administrator. The present invention can retain information related to the processes. A parent process, the guardian process, can initiate or terminate other processes. A guardian process can access process information to determine what number and type of processes to initiate. Further, the guardian process can examine the system information at an interval of time to determine what processes are running. Based on the system information and the process information, the guardian can identify any need to initiate, restart, or stop one or more processes. Further, the guardian process can pass process identification and other process information to an initiated process to assist the process in determining how to proceed.

Using a RDBMS with record locking capability, queue entries can be stored in a database with each queue entry being a row in a database relation, or table. As each entry is selected for processing, the row in the table that corresponds to the queue entry can be locked. Each process can examine a snapshot of the queue and attempt to access the next queue entry. If; the entry is not locked, the entry can be selected for processing. If the entry is locked, the entry cannot be selected by a subsequent process.

One or more tables can be used to retain message information. For example, an instance table can contain an entry for each instance of a message and retain queue information. This table can be examined by the processes to identify the next message to be processed.

Additional tables can be used to retain process information. For example, a process table can contain a class designation, instance identifier, flags, timestamps (e.g., last wake time and last sleep time), and a process state (e.g., run or not run). Another table can be used to define general information for each class of processes. For example, fields in the table can be used to assign names to the executables in each class.

A process parameters table contains parameter information for a process instance or for a class of processes. A process can be configured for periods of dormancy between work cycles (i.e., performing configured tasks). A process time table is used to determine the periods in which a process is to remain dormant. For example, the table can contain information regarding the time of day that a process is to run.

BRIEF DESCRIPTION OF THE DRAWINGS

FIG. 13C provides an example of a process parameters table.

DETAILED DESCRIPTION OF THE INVENTION

A method and apparatus for processing electronic mail in parallel is described. In the following description, numerous specific details (e.g., specific table entries) are set forth in order to provide a more thorough description of the present invention. It will be apparent, however, to one skilled in the art, that the present invention may be practiced without these specific details. In other instances, well-known features have not been described in detail so as not to obscure the invention.

Electronic mail systems store mail items while they wait to be processed by the system. In the present invention, queues can be used to store mail items awaiting processing by the mail system. For example, a mail message sent by one mail user to another may be stored in multiple queues on its journey from the sender to the recipient. The message is maintained in a queue awaiting whatever processing is needed. For example, a message being sent across a gateway to a user on another mail system may be stored in a remote queue to await forwarding to the other system. Upon its arrival at the remote node, it can be placed in a rerouting queue awaiting transmittal to the appropriate queue on the remote node.

The amount of traffic in a mail system can vary. As the mail activity varies, the number of items stored in a system queue can vary. For example, when mail activity increases while the ability to process the increased mail items remains stable, the number of mail items waiting to be processed can increase. The present invention provides the ability to extend the processing capability of an electronic mail system to handle such increases in activity. That is, the present invention provides the ability to process mail entries in parallel to accommodate increased messaging activity.

Conversely, when a decrease in mail activity occurs and processing capability remains stable, some processing capability can become idle. The present invention provides the ability to scale back processing capability to accommodate the reduced mail activity.

Figure 1A:
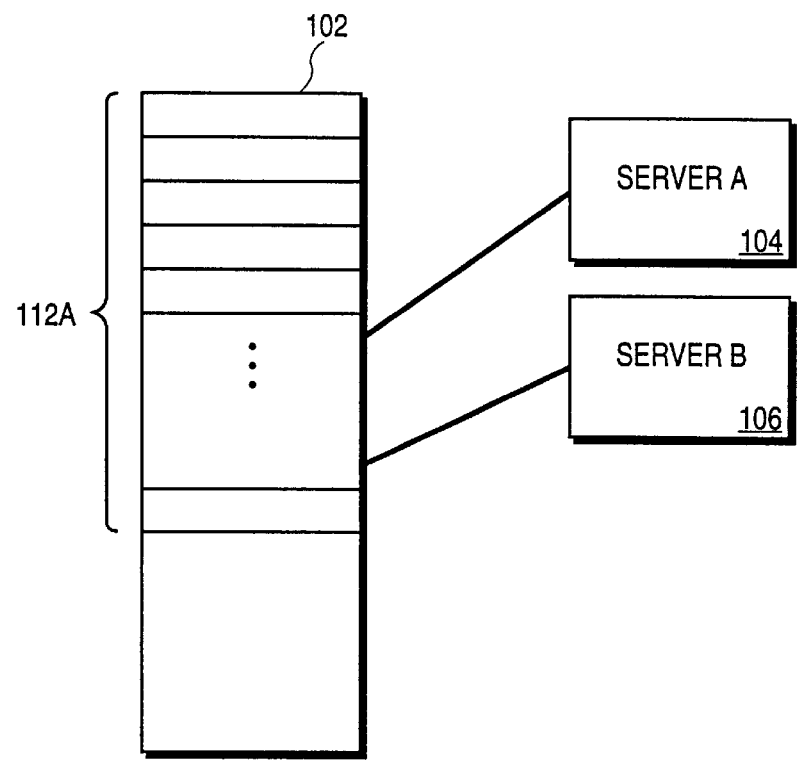
FIGS. 1A–1E illustrate mail system queues and processes.

The present invention provides the ability to scale a queue such that a queue can be generic and have one or more processes process a portion of the messages in the queue. Instead of assigning a message to a particular process, a message can be assigned to a queue. Further, multiple processes can be assigned to process a queue. FIG. 1A illustrates a mail system queue 102 that contains mail entries 112A. Mail entries 112A are assigned to queue 102. Server A 104 and Server B 106 have been configured to process mail entries in queue 102.

Server A 104 and Server B 106 select one or more of entries 112A in queue 102 to process. In the present invention, any selection technique can be used to select the next entry or entries to be processed by a process. For example, queue entries can be selected from the queue in the order in which they are received into the queue using a First In First Out (FIFO) method. Further, priorities can be assigned to queue entries. Thus, the selection can be made based on priorities assigned to queue entries.

Thus, using a selection technique, each process processing queue entries can identify the next entry or entries to be processed. Once an entry has been processed, it can be marked to prevent another process from processing the entry. Any method can be used to identify queue entries previously or currently being processed by one process without departing from the scope of the present invention.

In the preferred embodiment, messaging and process information are stored in a relational database system that provides the ability to perform locking at the record level. Such a relational database management system (RDBMS) is provided by Oracle Corporation. Using an RDBMS, messaging (e.g., queue entries) can be stored in relations, or tables, in the RDBMS. When a process selects a mail item (i.e., queue entry) for processing, the record that represents the item is locked. If another process attempts to select the same mail item from the queue, a locking exception is generated. Thus, subsequent processes can identify the queue entries handled by another process. Other methods for identifying items previously processed can be used without departing from the scope of the present invention.

Figure 1B:
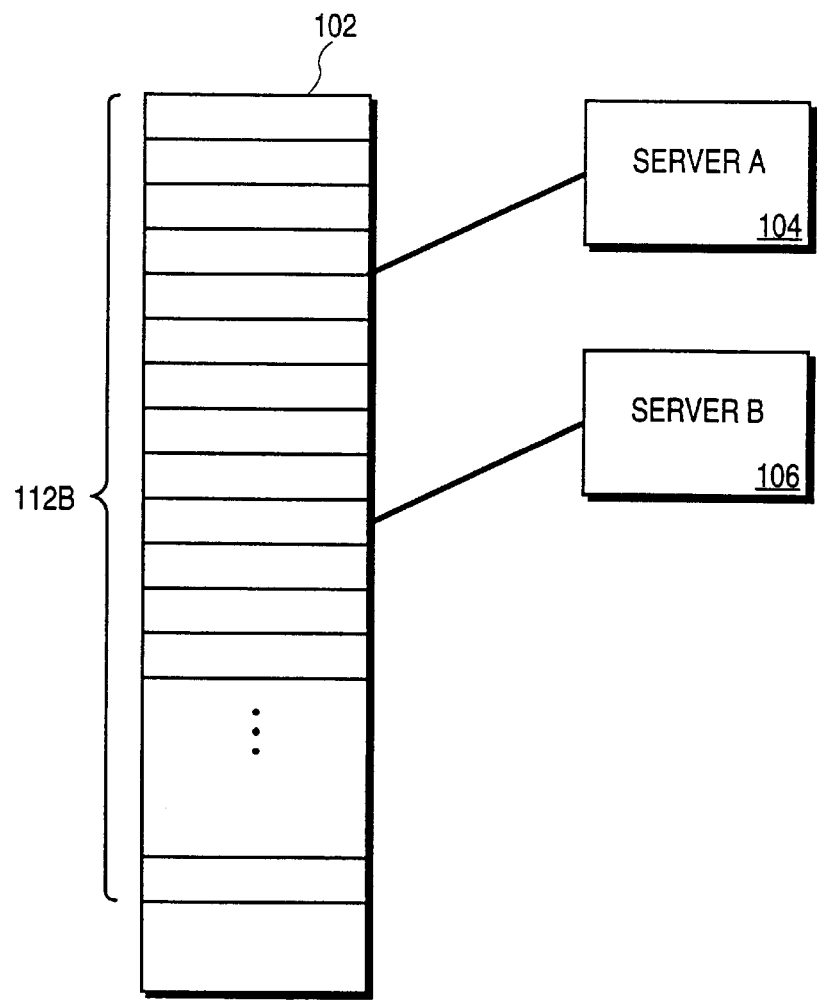

As mail system activity increases, there is an increase in the number of mail items that must be processed by the mail system. If processing capability remains stable, the number of mail entries in a queue can increase such as is illustrated in FIG. 1B. Queue 102 now contains entries 112B for processing by Servers A and B.

Figure 1C:
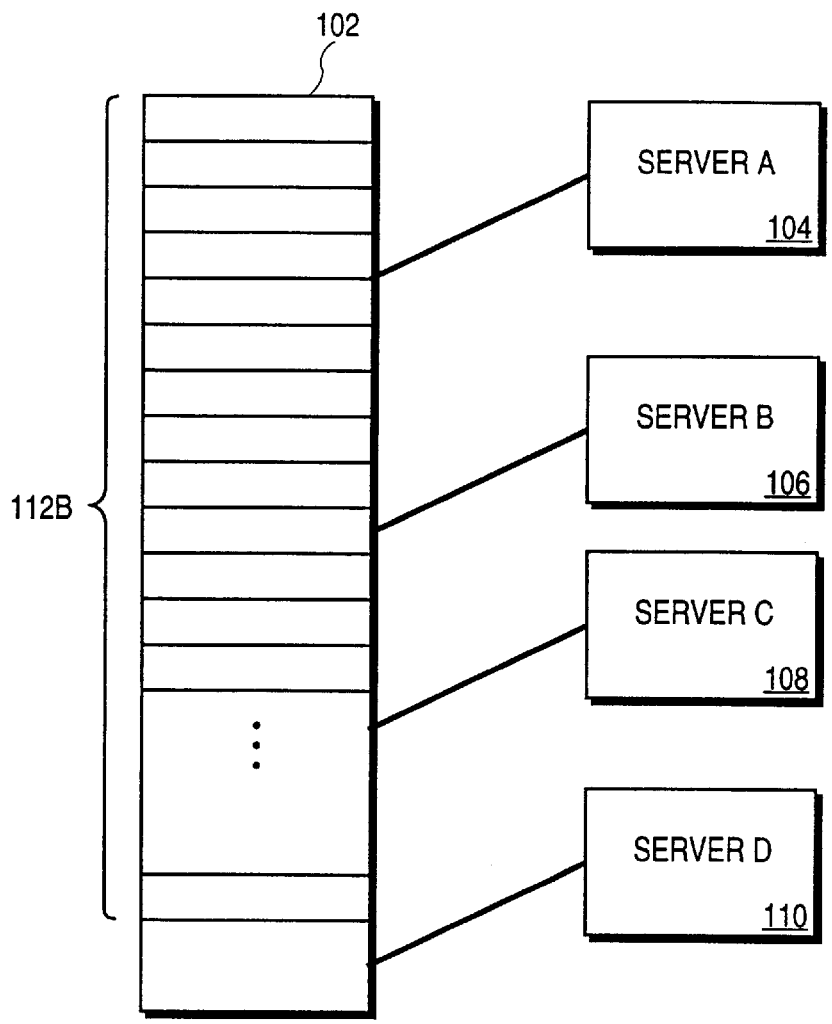
Figure 1D:
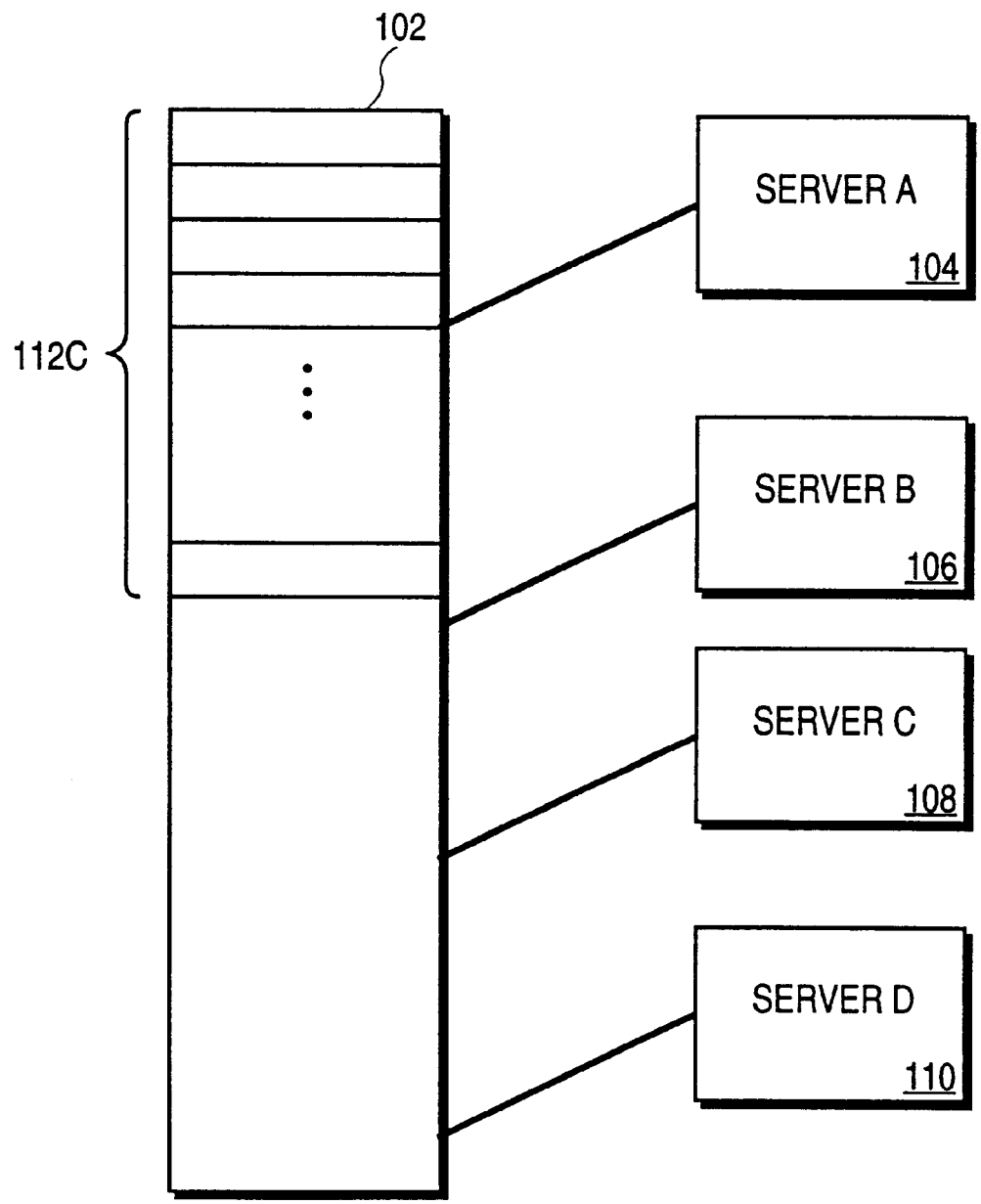
Figure 1E:
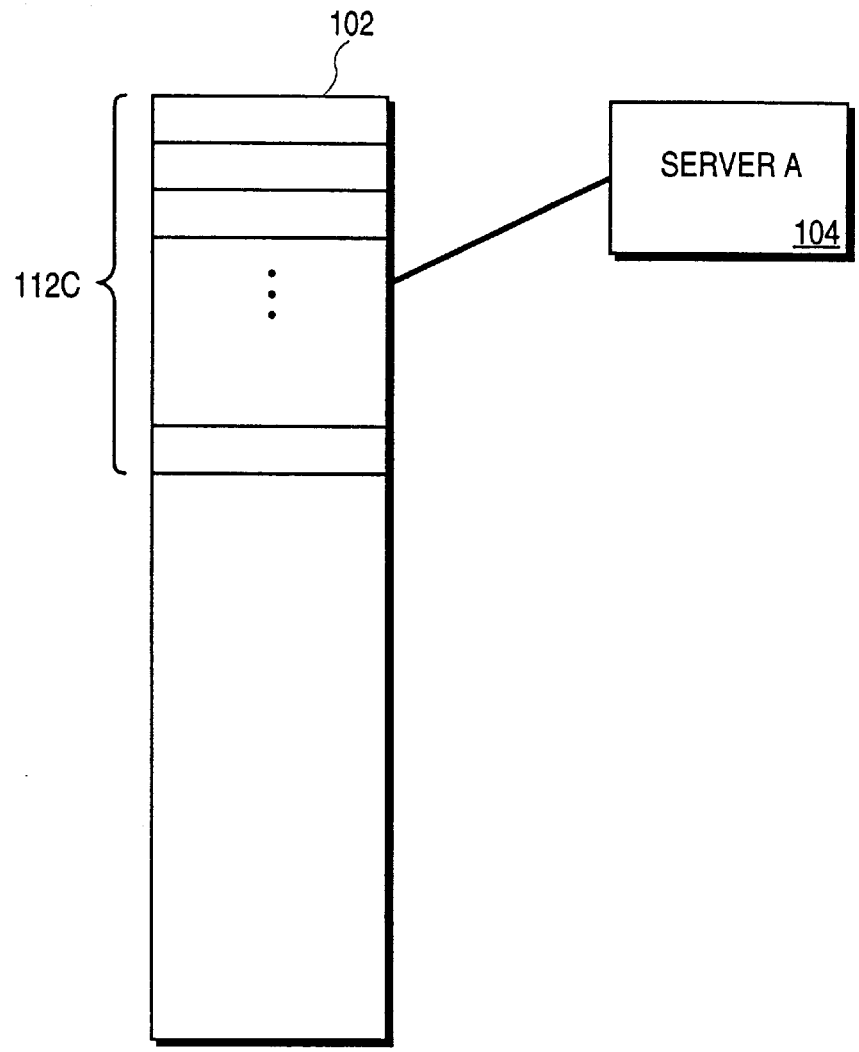

To handle the increase in queue entries, additional processes can be added as illustrated in FIG. 1C. In addition to servers A and B, servers C and D have been configured to process entries 112B. Assuming a stable level of system activity, the additional processing capability can result in a reduction in queue entries as illustrated in FIG. 1D. A system administrator, upon viewing the situation illustrated in FIG. 1D, can determine that some of the processing capability assigned to queue 102 is not needed and can be removed. FIG. 1E illustrates queue 102 and a reduction in the processing capability illustrated in Figure ID. That is, Servers B–D in FIG. 1D have been eliminated and one server (i.e., server A) remains to handle the mail entries 112C.

PROCESSES

Different types of processes can be used in the present invention to perform mail system tasks. The following are examples of processes and some of the tasks that can be performed in a mail system. Additional process types and tasks can be used with the present invention without departing from its scope. Examples of types of processes include: postman, scheduler, replicator, monitor, statistics, garbage collector, and guardian. A process can be used to perform multiple, or different tasks or activities. Further, processes can be configured to run during a certain time period. The number and characteristics of processes can be determined or altered by a electronic mail system administrator based on such factors as system activity levels.

A postman process, for example, delivers local mail items (e.g., scheduling and mail), remote mail items, handles triggered mail items (e.g., return receipts and auto-forward), and send notification of new messages locally. A scheduler process can be used to handle scheduling requests. A replicator process can be used to synchronize directory information. A monitor process can be used to check message flow, database space usage, and process status. A garbage collector process can remove unneeded mail items (e.g., unowned messages) and reclaim the space used for these items. A process, a guardian process, can act as the parent process for the other processes. The parent process can start and then stop the processes. It can verify that the proper number of each process type is running.

Multiple processes, for example, can be configured to perform garbage collection. A garbage collector process can be further configured to, for example, clean up mail or scheduler messages, or clean up replication or directory registration information. One of the garbage collector processes can run at night to perform garbage collection on mail messages. Another garbage collector can be run during the daytime to perform garbage collection tasks.

DATA TABLES

System information can be stored such that it can be reference intermittently during processing, and at system startup. In the preferred embodiment, this information is stored in a relational database system such as the relational database management system (RDBMS) provided by Oracle Corporation. Information stored in RDBMS tables includes messaging and processing information. Specific details used to describe the type of information associated with mail and processes is only for the sake of illustration. Additional or different information can be used without departing from the scope of the invention.

Process Information

Figure 13A:
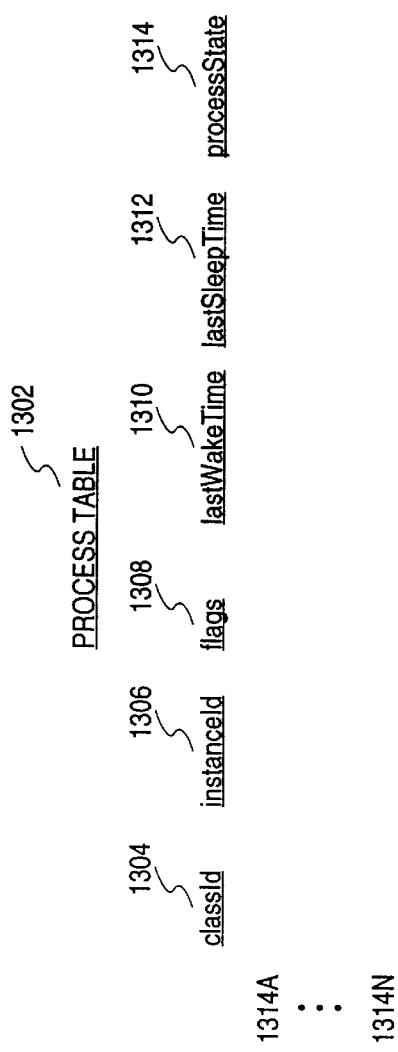
FIG. 13A illustrates a process table.

A process is assigned a record in a process table. This record is used by the guardian process as a request for invocation. FIG. 13A illustrates a process table. Classid 1304 contains an identification of a process class (e.g., postman). InstanceId 1306 contains a unique value within a particular process class. It differentiates among different instances of a particular class of process.

Flags field 1308 can contain any number of flags to further define a process instance. For example, flags 1308 can be used to particularize the tasks to be performed by a process instance. Thus, multiple instances of a process class can handle some subset of the total tasks defined for the class.

The flags field for an instance of the postman process, for example, can be used to indicate that the postman instance perform local delivery, remote delivery, gateway processing, or notification. To illustrate further, the flags field for an instance of a garbage collector process can be used to indicate that the process cleanup registration records, or perform scheduler, directory, or mail garbage collection.

A process instance can become dormant during execution. For example, during its active state, a process can perform its tasks. After performing its task, the process can lay dormant, or passive, for a period of time before becoming active again and performing its defined tasks. LastWakeTime 1310 is used to identify the time at which a process awoke from a dormant period. LastSleepTime 1312 is used to identify the time at which the process last entered into a dormant period. ProcessState 1314 indicates the state of a process (e.g., whether or not the process should be run).

Figure 13B:
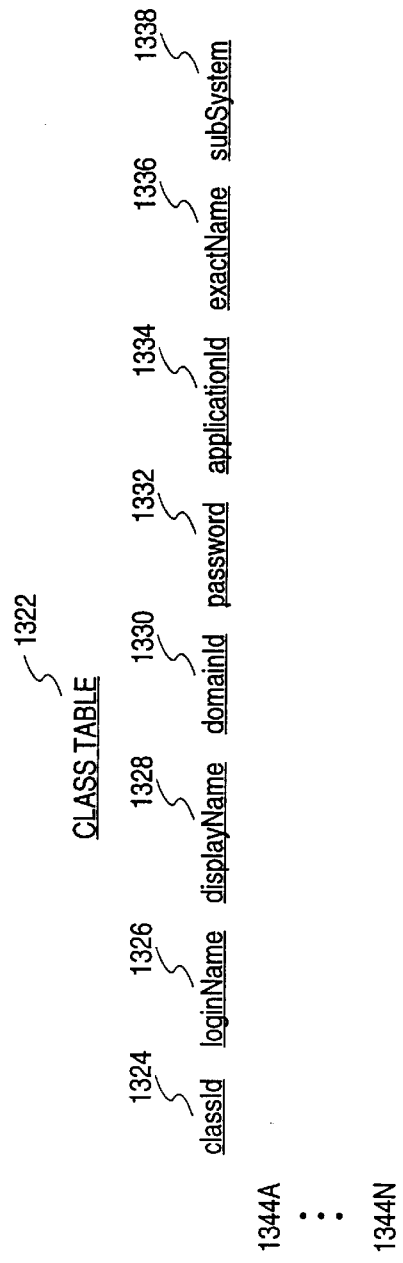
FIG. 13B provides an example of a class table structure.

Class information is stored in the class table. The guardian process can, for example, use the information contained in this table to determine names for an executable in each class. FIG. 13B provides an example of a class table structure. ClassId 1324 has the same meaning as in the process table. LoginName 1326 and password 1332 are used to authenticate the login to, for example, the RDBMS.

DisplayName 1328 is used to identify a process class, for example, in a configuration or management panel or report. DomainId 1330 can be used for gateways (i.e., a link between systems with different protocols) and for user-defined applications as defined by ApplicationId field 1334. ExecName 1336 identifies the name of an executable module (i.e., a module capable of execution in the system). Subsystem field 1338 can be used to group together a variety of individual processes into a single module (i.e., mail or schedular).

A guardian process is responsible for invoking a process and passing to the initiated process its process class and instanceId value. A guardian process can access process information to determine what number and type of processes to initiate.

Further, the guardian process can examine the system information at an interval of time to determine what processes are running. Based on the system information and the process information, the guardian can identify any need to initiate, restart, or stop one or more processes. Further, the guardian process can pass process identification and other process information (i.e., parameters) to an initiated process to assist the process in determining how to proceed.

Parameters specific to each individual server can be defined in a process paramaters table. Further, generic process parameters can be stored in the parameters table. Once a process is initiated, it is responsible for fetching any parameters in the parameters table. Further, each process can determine the frequency at which to refresh the values for its parameters. FIG. 13C provides an example of a process parameters table.

ClassId 1354 has the same meaning as previously described. InstanceId 1356 identifies a process instance as previously described, or identifies that the record contains generic, class parameters. That is, a null or zero value for instanceId 1356 indicates that the corresponding record contains class level parameters. These generic parameters can be overridden by specific parameters (i.e., parameters specific to a process instance). Parameter 1358 identifies a particular parameter. The valueNum 1360, valueChar 1362, and valueDate 1364 fields contain the actual parameter values (i.e., of type number, character, and date, respectively).

Figure 14A:
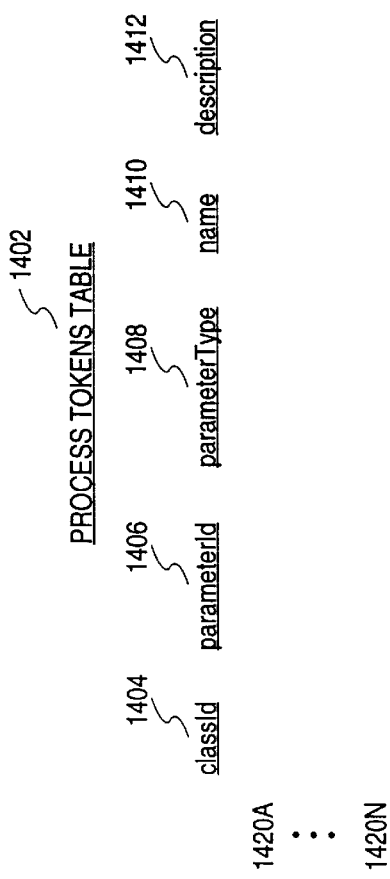
FIG. 14A provides an example of a process tokens table.

Each parameter for a process is paired with an identifying token. Tokens are stored in the process tokens table. Tokens can be described, for example, by the mail administrator. FIG. 14A provides an example of a process tokens table. ClassId 1404 has the same description as previously described. ParameterId 1406 identifies a particular parameter. ParameterType 1408 identifies parameter types (e.g., number, character and date). Name 1410 can be used to identify the token in a display. The description field 1412 can be used to provide a description or commentary for a token.

Figure 14B:
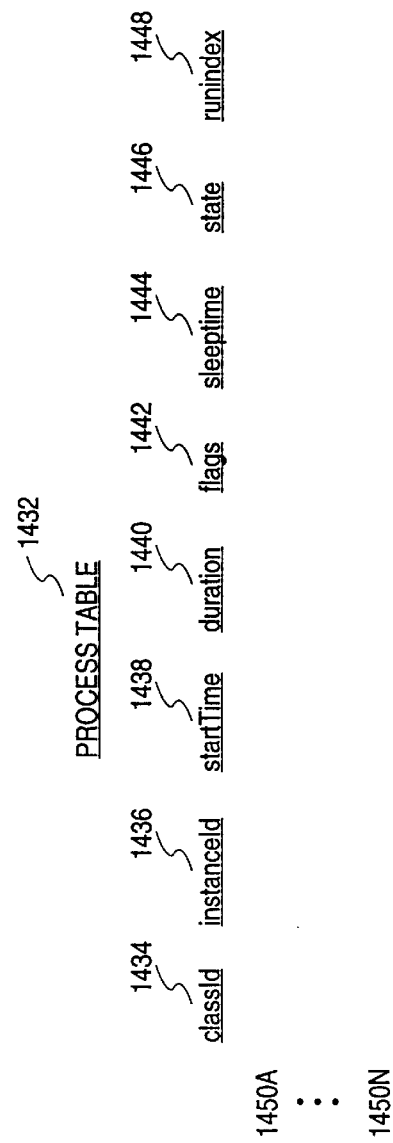
FIG. 14B provides an illustration of a process time table.

Each process has associated record(s) in the process time table. The process time table is used to manage the wake and sleep times for a process instance. Process time table records can be used by an instantiated process to determine its actual requested Active and Passive (i.e., sleeping) times. FIG. 14B provides an illustration of a process time table.

The classId field 1434 and instanceId field 1436 are the same as the similarly-named fields in the previously described tables. StartTime 1438 contains the value that identifies when a process begins its current state. The duration field 1440 indicates the length of time that a process is to remain in a state (e.g., active or dormant). The process will compare the startTime and duration values and the current time to determine whether or not it is to change states.

The flags field 1442 is used to specify the desired state during this designated time. For example, a flags value may indicate active to specify that the associated process is to be active at this time, or it may be used to indicate passive to specify that the process is meant to be dormant during this time. Processes can be tuned with this parameter having a different value during different times of the day. The sleep-Time field 1444 indicates the delay (e.g., in minutes) between cycles. The state field 1446 indicates the state of the process (e.g., active or passive). The runIndex 1448 indicates a run state that is examined for changes.

Mail Objects

Figure 15:
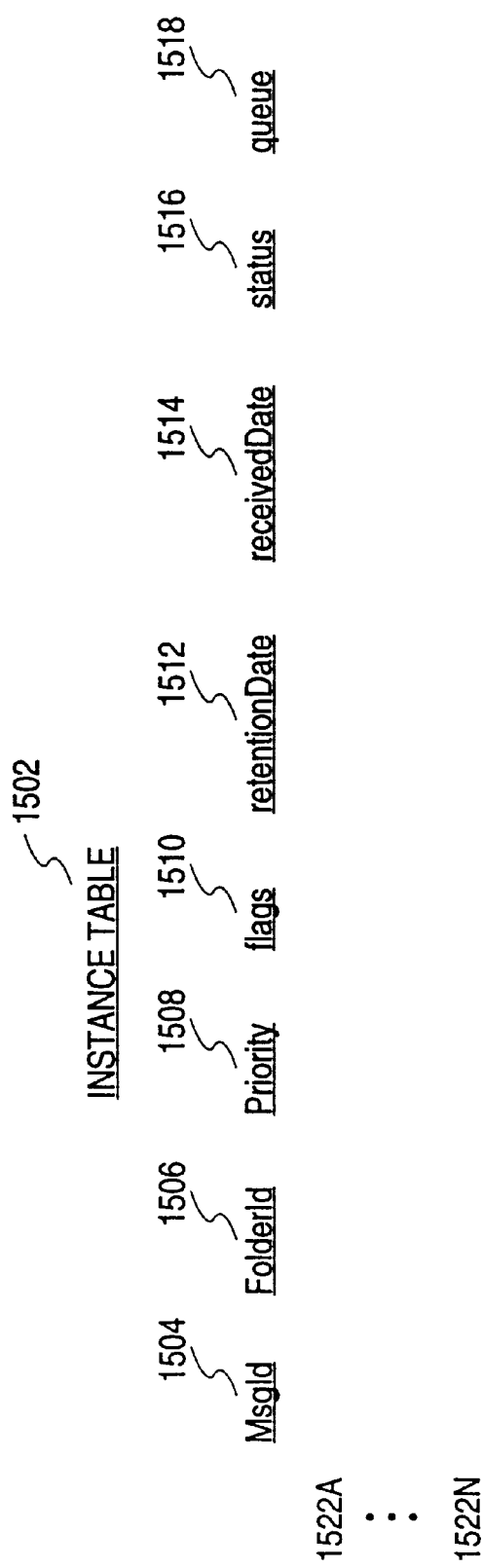
FIG. 15 provides an example of an instance queue table.

As previously indicated, mail objects (e.g., messages) can be retained in tables in an RDBMS. Tables can indicate one or more queues to which a mail object belongs. A message can be contained in more than one queue. For example, a message sent to both local and remote users can be contained in multiple queues (e.g., a local delivery queue and remote delivery queue). Further, information associated with mail objects can be stored in tables such as an instance table. An instance table entry contains information associated with a message instance. FIG. 15 provides an example of an instance table.

Each object is identified by an identifier that is unique at each node. The msgId 1504 provides this unique identification. Using a unique message identifier, for example, provides the ability to relate additional mail object information in other tables with a given mail object. FolderId 1506 provides ownership and location information. For example, a user's inbox value is stored in the folderId field value for new, unread or read messages. Or a gateway outbox value is stored in the folderId field for a message awaiting submission to a gateway.

A priority field 1508 identifies a mail object's priority. As previously indicated, the priority can be used to determine the order in which mail objects are processed. The flags field 1510 provides additional information associated with a mail object. For example, whether or not the owner of a message is a blind carbon copy recipient. The retentionDate and receivedDate fields (i.e., 1512 and 1514, respectively) provide time stamp. information that can be used, for example, in garbage collection or as the entry time of a message in a queue. Status 1516 indicates the state of a mail object (e.g., new or unread).

The queue field 1518 defines the queue in which the associated mail object instance resides. This field can be examined by a process to determine the mail objects to be processed in a particular queue. For example, a postman process that is configured to perform a notification task may examine the instance table to identify objects in the notification queue that are to be processed.

GUARDIAN

A guardian process determines the number and type of processes to initiate based on configuration information supplied by the mail system administrator. In the preferred embodiment, this information is stored in relations in an RDBMS as previously described. However, any method of retaining configuration information can be used with the present invention.

Further, the guardian process retains a snapshot of current processes, and can obtain a new snapshot. Based on a comparison of the two snapshots and the configuration information, the guardian can determine whether or not to initiate, restart, or stop one or more processes. Further, the guardian process can pass process identification and other process information to a process. A guardian process can act as the parent process for other processes. It spawns or terminates a process after it verifies the proper number of each process type.

Figure 2A:
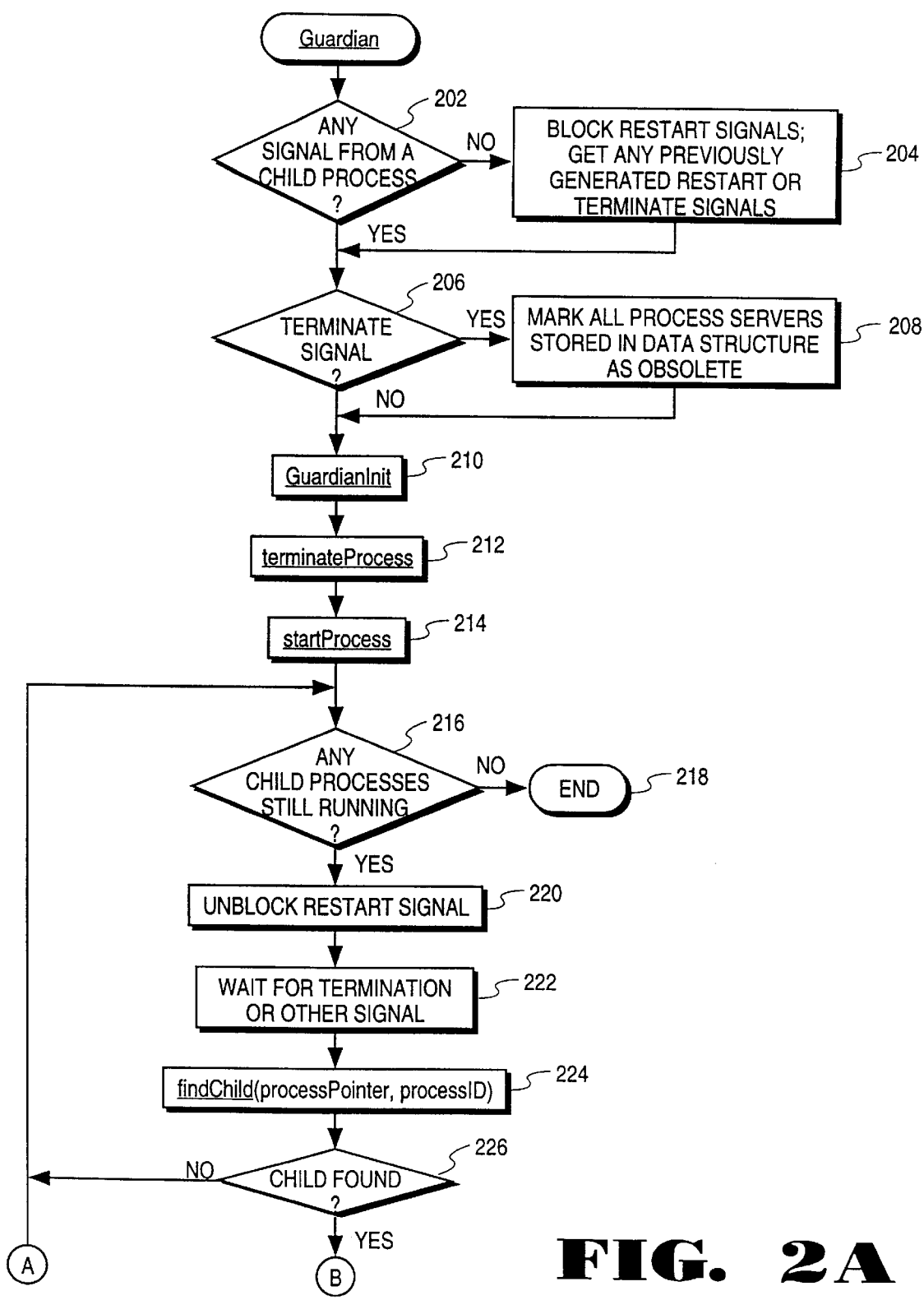
FIGS. 2A–2B illustrates a process flow for a guardian process.
Figure 2B:
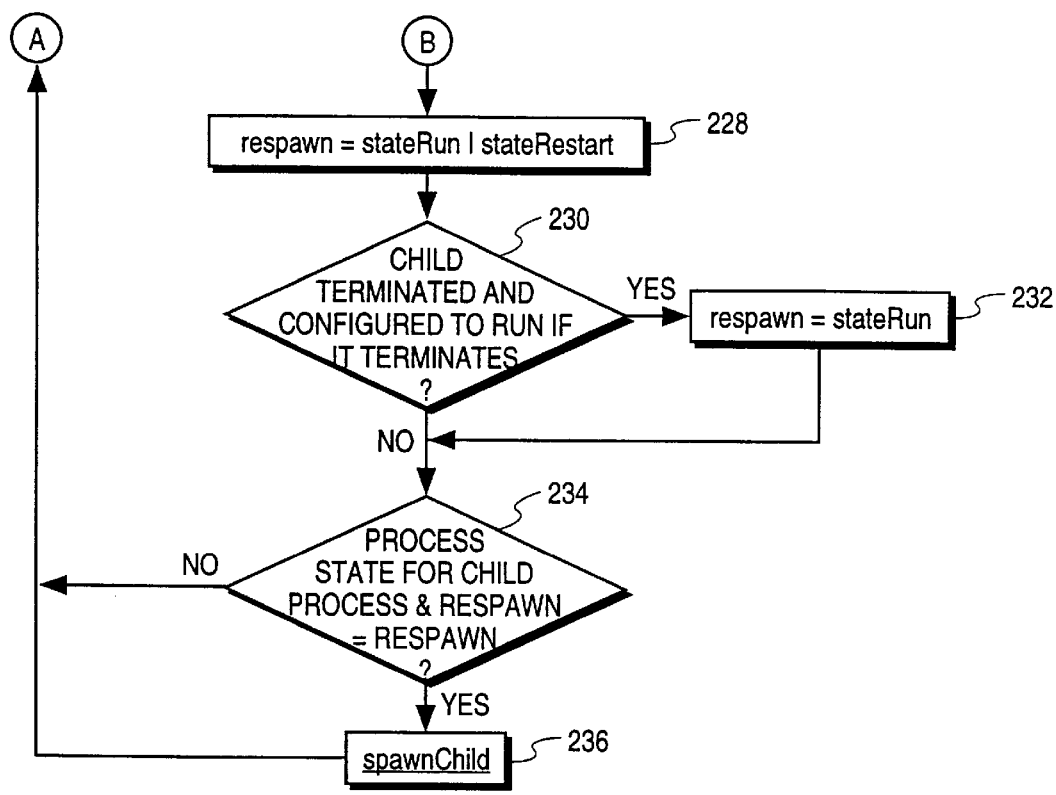

FIGS. 2A–2B illustrates a process flow for a guardian process. At decision block 202 (i.e., "any signal from a child process?"), if there is no signal from a child process, processing continues at block 204 to block any restart signals and to get any previously generated restart or terminate signals that have not been processed. Processing continues at decision block 206. If a signal is received from a child process, processing continues at decision block 206.

At decision block 206 (i.e., "terminate signal?"), if the signal is a terminate signal, processing continues at block 208 to mark all processes spawned by the guardian as obsolete (i.e., terminable). Processing continues. at processing block 210. If, at decision block 206, the signal is not a terminate signal, processing continues at block 210 to invoke GuardianInit to, for example, generate a new process snapshot. At block 212, terminateProcess is invoked to kill the appropriate processes. At block 214, startProcess is invoked to start the appropriate processes.

At decision block 216 (i.e., "any child processes still running?"), if there are no spawned processes running, processing ends at block 218. If spawned processes are running, processing continues at block 220 to unblock the restart signal. At block 222, guardian waits for a signal. Signals can be generated by a child or as a result of system administrator input. When guardian receives a signal, processing continues at block 224. At block 224, findChild is invoked to identify the processed associated with the signal generator. At decision block 226 (i.e., "child found?"), if the signal generator is unknown, processing continues at block 216.

If, at decision block 226, the signal generator is identified, processing continues at block 228. At block 228, the respawn variable is set to include the run and restart alternatives. At decision block 230 (i.e., "child terminated and configured to run if it terminates?"), if a terminated process is configured to be restarted upon termination, processing continues at block 232 to reset respawn to indicate "stateRun" and processing continues at decision block 234. If not, processing continues at decision block 234.

At decision block 234 (i.e., process state for child process & respawn=respawn), if the state of a child process (i.e., signal generator) is to be respawned based on the value of the respawn variable, processing continues at block 236 to invoke spawnChild. Processing continues at decision block 216. If it is determined that the child process is not intended to be respawned, processing continues at decision block 216.

GuardianInit

Figure 3:
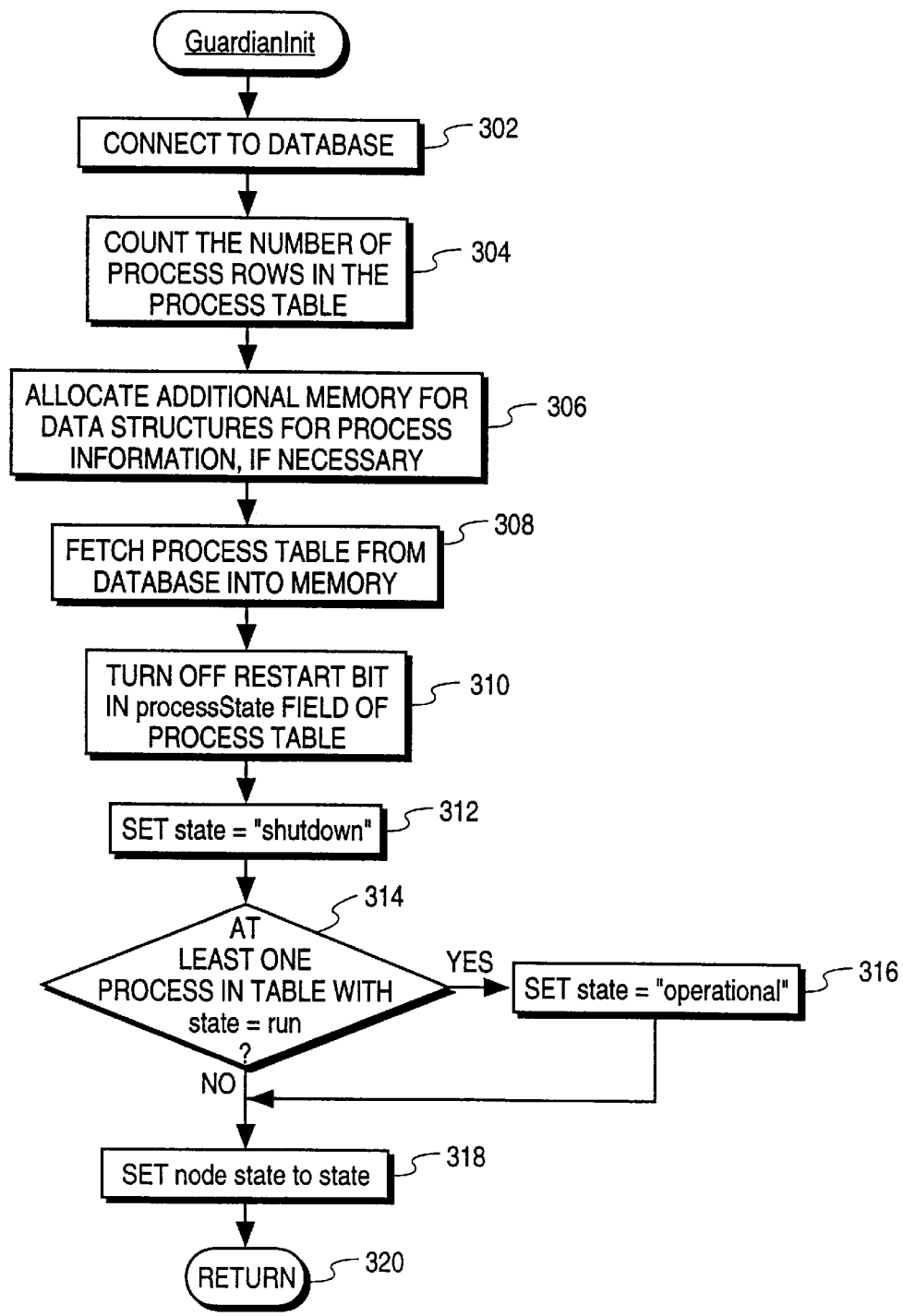
FIG. 3 illustrates a guardianInit process flow.

GuardianInit is invoked in the guardian process flow to, for example, fetch a new process snapshot from the RDBMS. FIG. 3 illustrates a guardianInit process flow. At block 302, an RDBMS connection is established. At block 304, the number of processes in the process table is determined. This count can be used, for example, for memory allocation purposes. As illustrated in block 306, the count is used to allocate any additional memory for the process information data structures stored in memory and accessed by the guardian process.

At block 308, a new process snapshot is fetched from the process table. At block 310, the restart bit in the processState field of the process table is turned off. At block 312, a node state variable is set to "shut down." At decision block 314 (i.e., "at least one process in table with state='run'?"), if the snapshot contains at least one process that is to be run, processing continues at block 316 to set the node state variable to "operational," and processing continues at block 318. If not, processing continues at block 318. At block 318, the state of the node is set to the node state variable. Processing returns at block 320.

TerminateProcess

Process termination can, for example, occur when it is determined that a surplus of processing capability exists for a given queue. For example, a mail system administrator monitoring system activity may determine that a queue that is being managed, or handled, by two Postman processes, can be managed by one Postman process. The system administrator can generate a signal for the guardian to terminate one of the Postmen. Further, processes may be terminated when shutting down a mail system.

Figure 4:
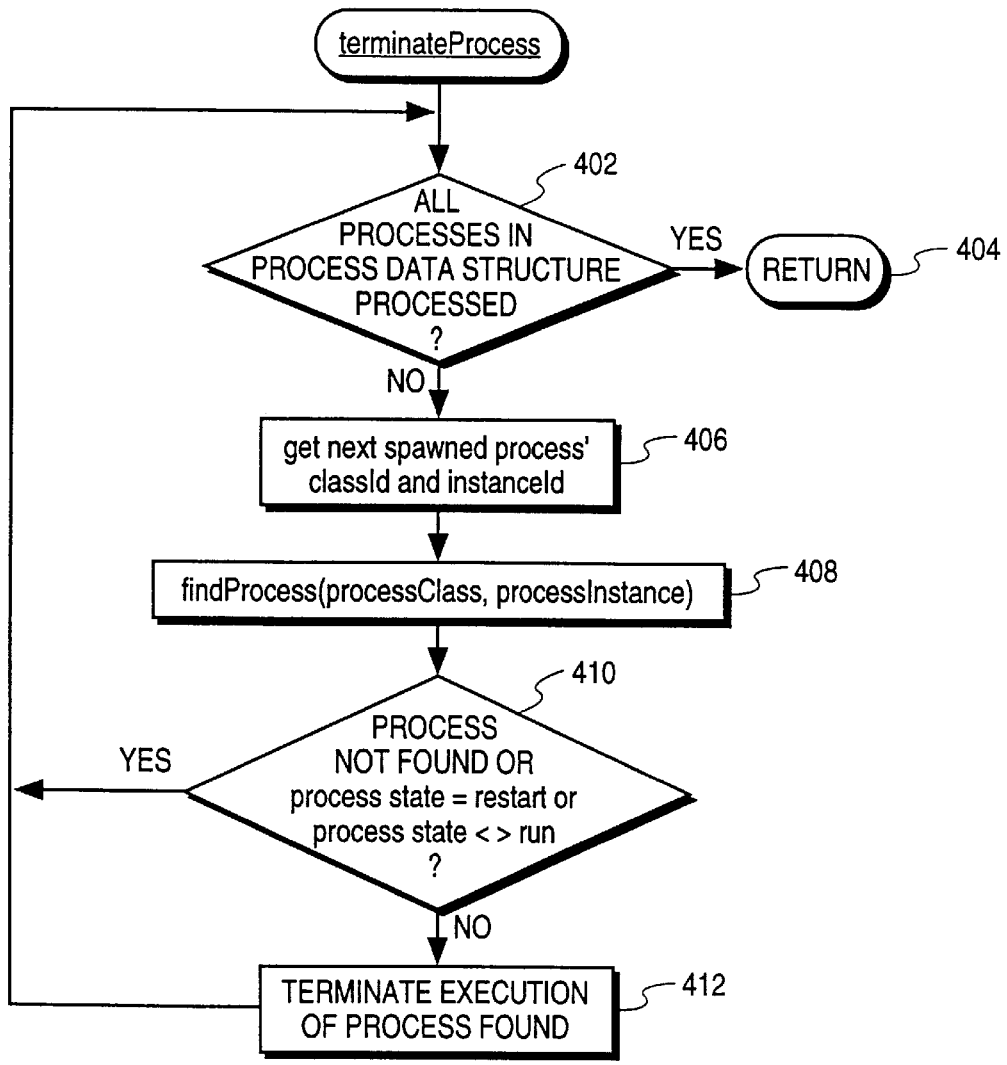
FIG. 4 illustrates a terminateProcess process flow.

FIG. 4 illustrates a terminateProcess process flow. At decision block 402 (i.e., "all processes in process data structure processed?"), if all of the processes in the guardian's process snapshot have been processed, processing returns at 404. If not, processing continues at processing block 406. At block 406, the next spawned process' classId and instanceId are identified. At block 408, findProcess is invoked to locate a snapshot entry corresponding to the spawned process' classId and instanceId.

At decision block 410 (i.e., "process not found or process state=restart or process state <>run?"), if the entry in the process snapshot is to run or be restarted upon termination, or was not found, processing continues at decision block 402 to process any remaining children. If not, processing continues at block 412 to terminate the execution of the process. Processing continues at decision block 402 to process any remaining processes.

StartServer

Figure 5:
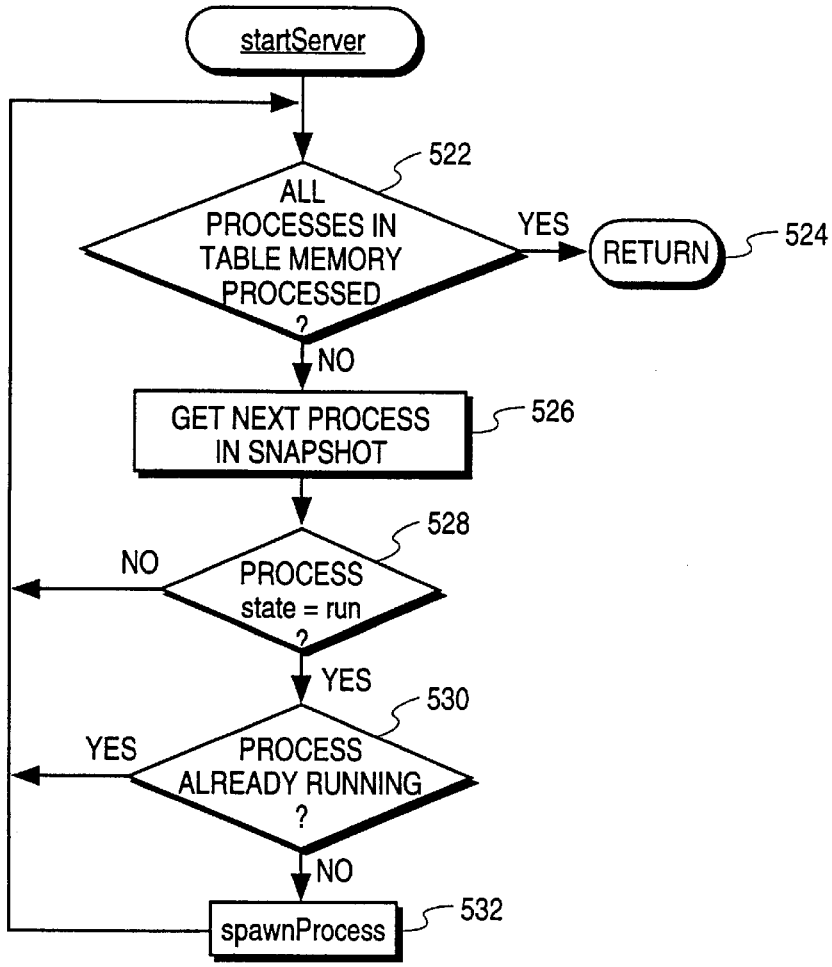
FIG. 5 illustrates a startServer process flow.

Processes can be initiated by a guardian process, for example, upon a system startup, or when additional processing capability is needed to handle an increase in mail activity. FIG. 5 illustrates a startServer process flow. At decision block 522 (i.e., "all processes in table memory processed?"), if all processes have been processed, processing returns at block 524. If not, processing continues at block 526 to get the next process in the process snapshot.

At decision block 528 (i.e., "process state='run'?"), if the state of the process is not set to run, processing continues at decision block 522 to process any remainder of the processes. If the process state is equal to run, processing continues at decision block 530. At decision block 530 (i.e., "process already running?"), if the process is already running, processing continues at decision block 522 to process the remaining processes. If not, processing continues at decision block 532.

One technique for determining whether or not a process is already running, involves maintaining a list of executing processes and their associated class and instance identifications. Thus, the list of executing processes can be examined to determine whether or not a process is already running. Any other method can be used without departing from the scope of the invention.

At processing block 532, spawnProcess is invoked to initiate the process. Processing continues at decision block 522 to process any remaining snapshot entries.

findChild

Figure 6:
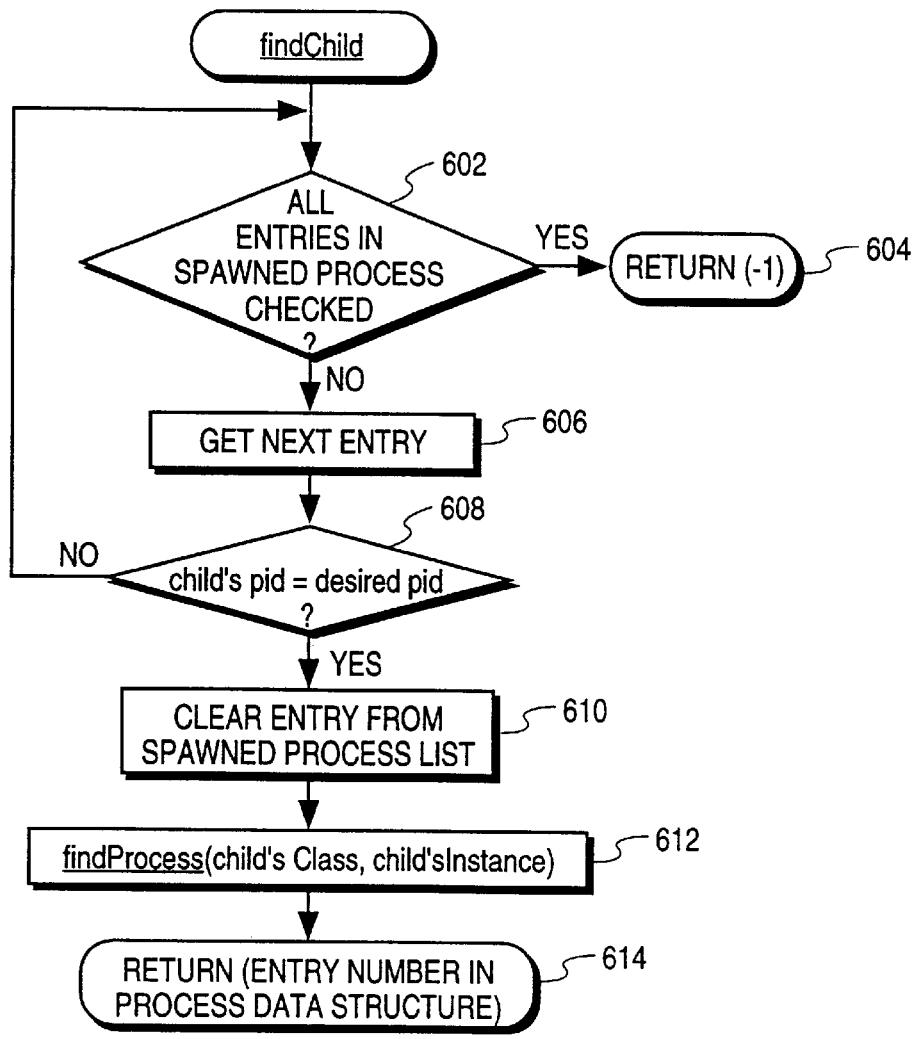
FIG. 6 illustrates a findChild process flow.

The findChild process can associate an executing process with a process snapshot entry based on like process information (e.g., classId and instanceId). It can be invoked, for example, to determine which child process terminated. FIG. 6 illustrates a findChild process flow. At decision block 602 (i.e., "all entries in spawned process list checked?"), if all entries in a list of executing processes has been processed, processing returns at 604 with a return code to indicate that no child process was found (e.g., a negative one).

If all entries have not been processed, processing continues at block 606 to obtain the next entry in the list. At decision block 608 (i.e., "child's pid=desired pid?"), if the entry's process identification (e.g., process identification generated by the operating system when the process was initiated) is not the same as the desired pid (e.g., the pid accompanying the process' termination signal), processing continues at decision block 602 to examine the remaining entries in the spawned process list.

If it is the same, processing continues at block 610 to delete the entry from the spawned process list. At block 612, findProcess is invoked to identify the terminated process' entry in the process snapshot. The location of the process in the process snapshot is returned at block 614.

findProcess

Figure 7:
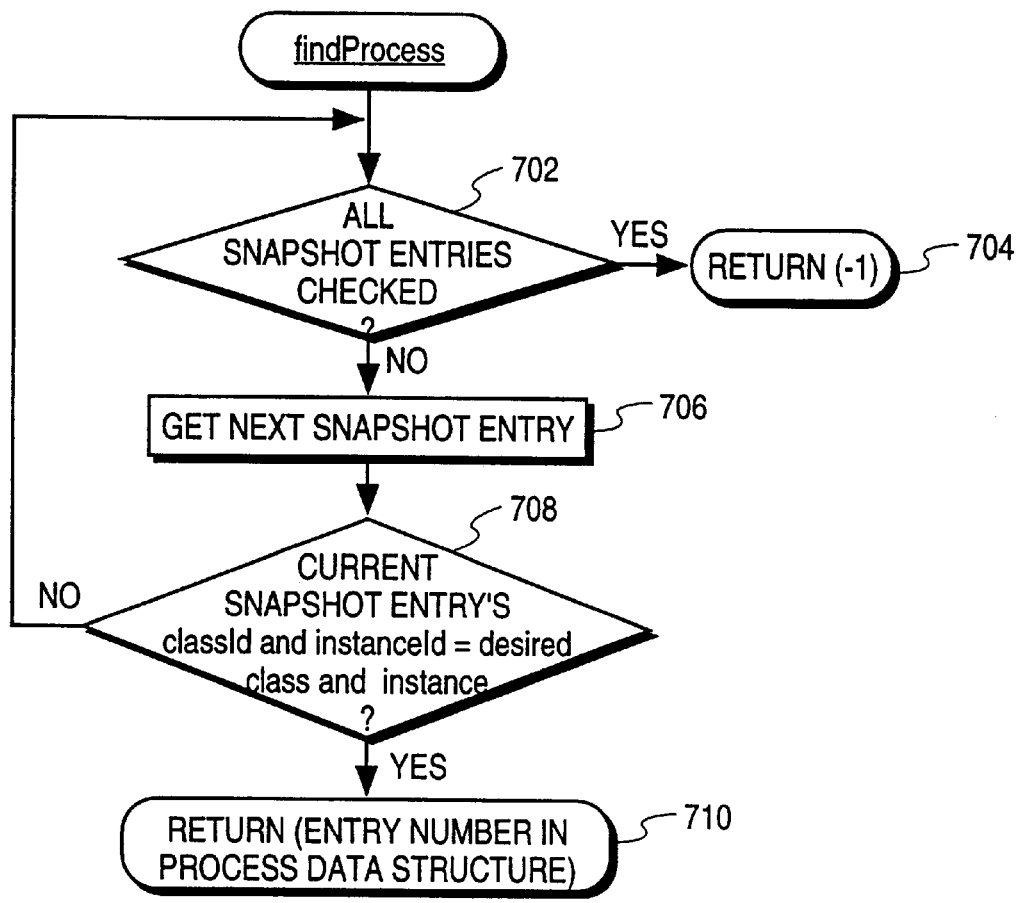
FIG. 7 illustrates a findProcess process flow.

An entry in the process snapshot can be obtained using the findProcess flow illustrated in FIG. 7. At decision block 702 (i.e., "all snapshot entries checked?"), if all snapshot entries have been checked, processing returns at 704 with a return code to indicate that no snapshot entry was found (e.g., a negative one). If not, processing continues at block 706 to get the next snapshot entry.

At decision block 708 (i.e., "current snapshot entry's classId and instanceId=desired class and instance?"), if the current entry has the same class and instance identification as the desired class and instance information, processing returns at block 710 with a snapshot entry identification. If not, processing continues at decision block 702 to process any remaining snapshot entries.

spawnProcess

Figure 8:
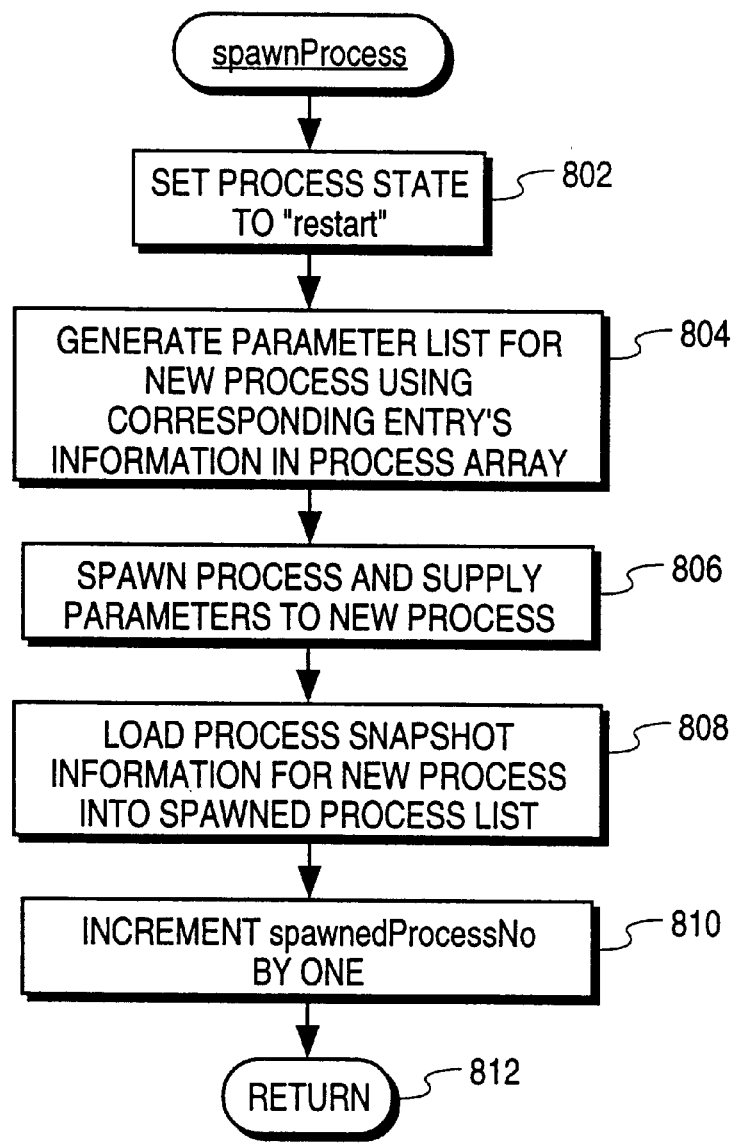
FIG. 8 illustrates a spawnProcess process flow.

FIG. 8 illustrates a process flow, spawnProcess, for spawning a child process. At block 802, the process state is set to "restart." At block 804, a parameter list (e.g., classId and instanceId) is generated to pass to the spawned process. The process is spawned (e.g., using a fork operation in Unix) and the parameters are passed to the new process at block 806. At block 808, information associated with the spawned process is stored in the spawned process list (e.g., class, instance, spawned process' system identification). At block 810, the spawnedProcess counter is incremented by one. Processing returns at block 812.

SPAWNED PROCESS

Different types of processes can be used in the present invention to perform mail system tasks. A process' configuration is determined from the information in the process tables (e.g., process, class, process parameters, process time, and process tokens tables). A configuration can, for example define the tasks to be performed by a spawned process. Examples of types of process' and associated tasks have been described previously. Additional or different process types and tasks can be used without departing from the scope of this invention.

Figure 9A:
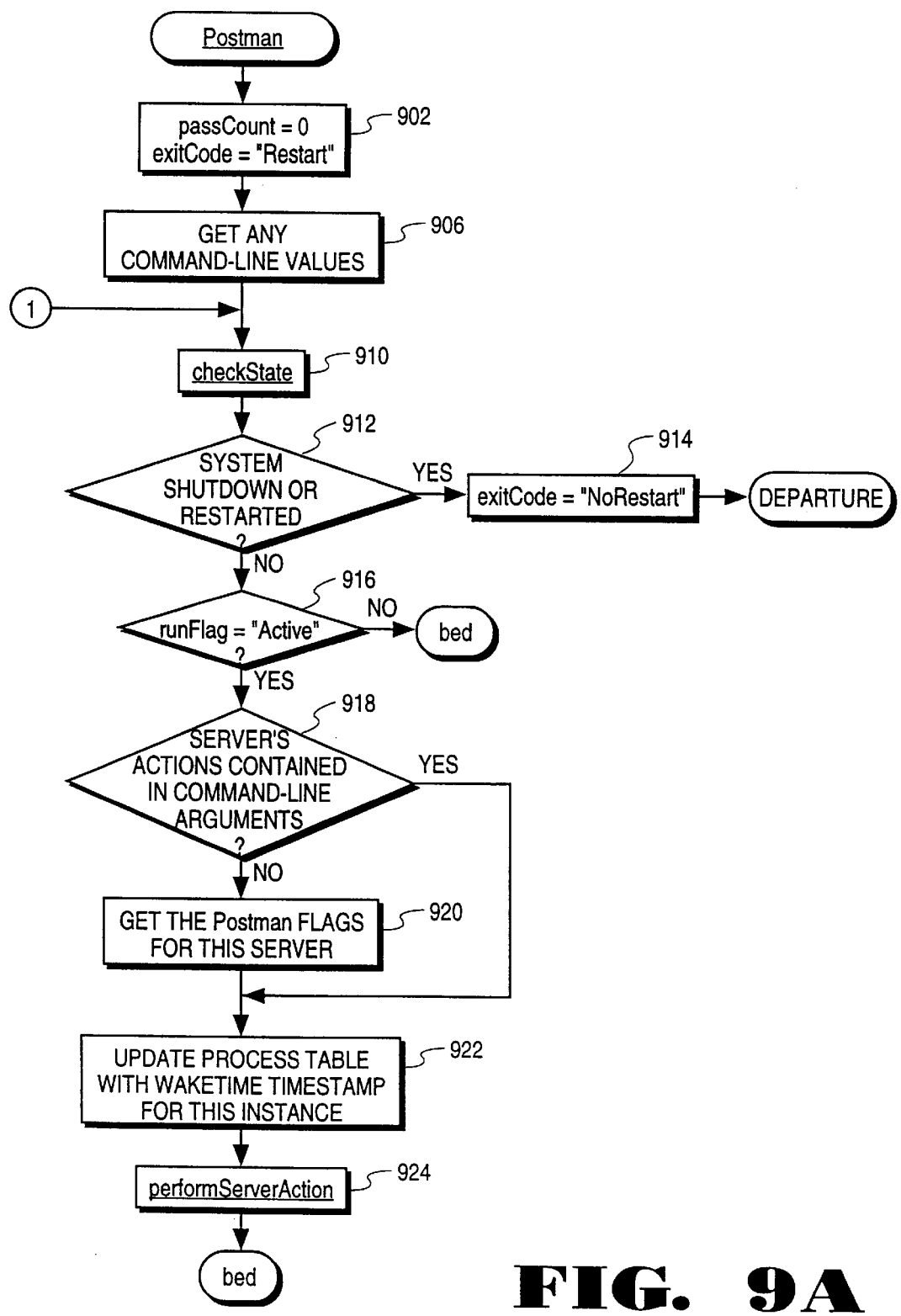
FIGS. 9A–9D illustrates a postman process flow.

As previously described, a postman process can deliver local mail objects, remote mail objects, handle triggered mail objects (e.g., return receipts and auto-forward), and send local users notification of new messages. FIG. 9A illustrates a postman process flow. At block 902, passCount is set to zero and exitCode is initialized to "Restart." At block 906, any parameters sent by the invoking process are obtained. At block 910, checkState is invoked to determine the state of a process and system.

At decision block 912 (i.e., "system shutdown or restarted?"), if the system was shutdown or restarted, processing continues at block 914 to set the exitCode to "noRestart," and processing continues at block 926. If not, processing continues at decision block 916. At decision block 916 (i.e., "runFlag='Active'?"), if the flag indicates that the process is not meant to be active during this period, processing continues at decision block 940.

If the process is meant to be active, processing continues at decision block 918. At decision block 918 (i.e., "server's actions contained in; command-line argument?"), if configuration information was passed to the process, processing continues at block 922. If not, processing continues at block 920 to get the postman flags for this process from the process parameters table. At block 922, the process table's wake-Time timestamp associated with this process is updated. At block 924 performServerAction is invoked to perform the tasks configured for this process. Processing continues at decision block 940.
Dormancy A process can be configured to sleep after completing a processing pass or cycle wherein the process attempts to perform tasks for which it is configured to perform. As illustrated in the Postman process flow, the dormancy stage of processing can be initiated when the postman completes one cycle of processing, or when the process' flags indicates that the process is meant to be dormant.

Figure 9B:
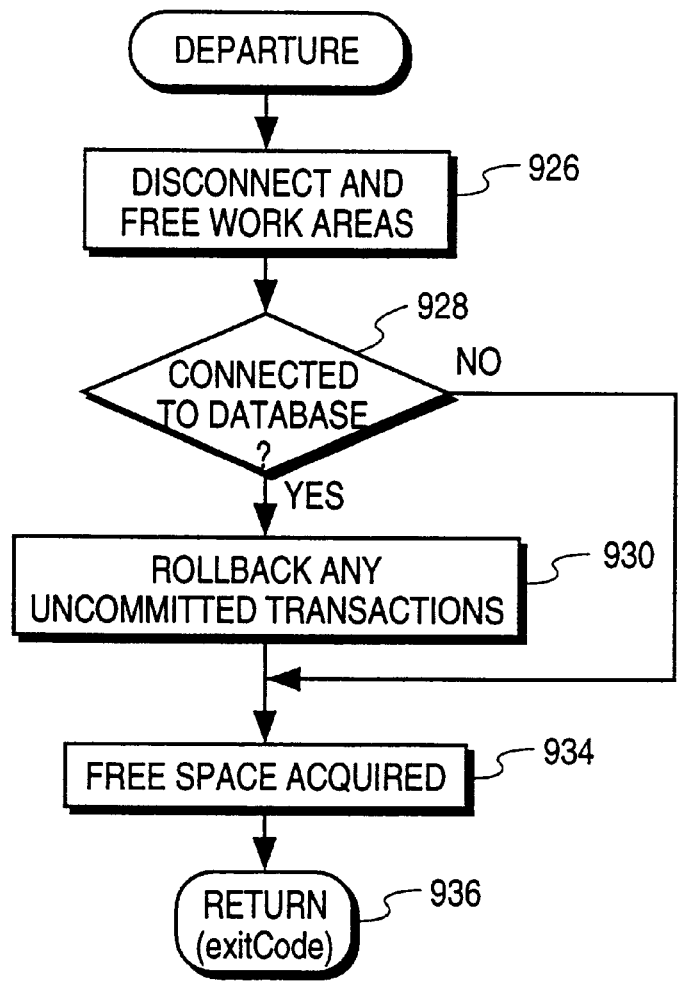
Figure 9C:
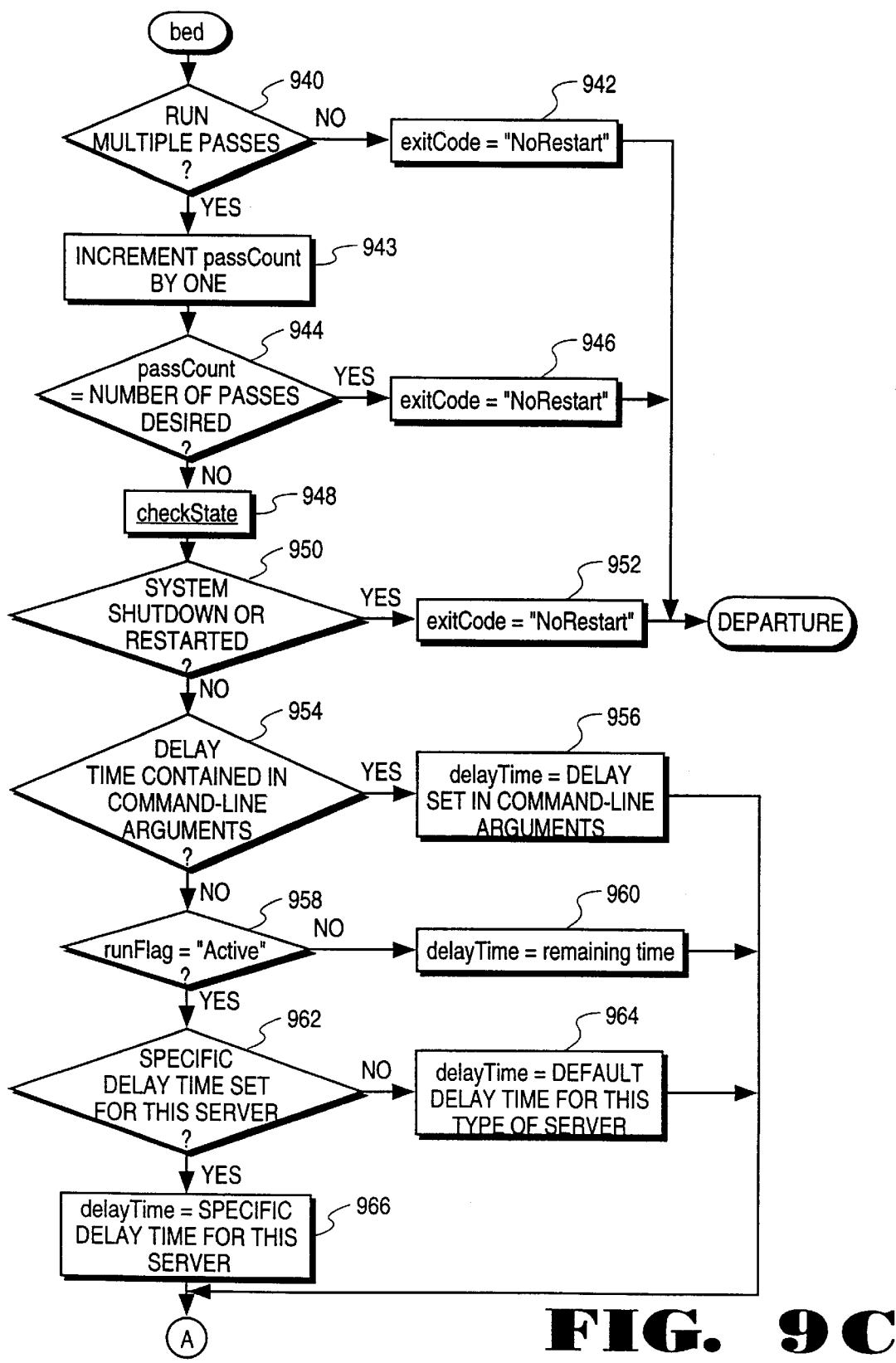
Figure 9D:
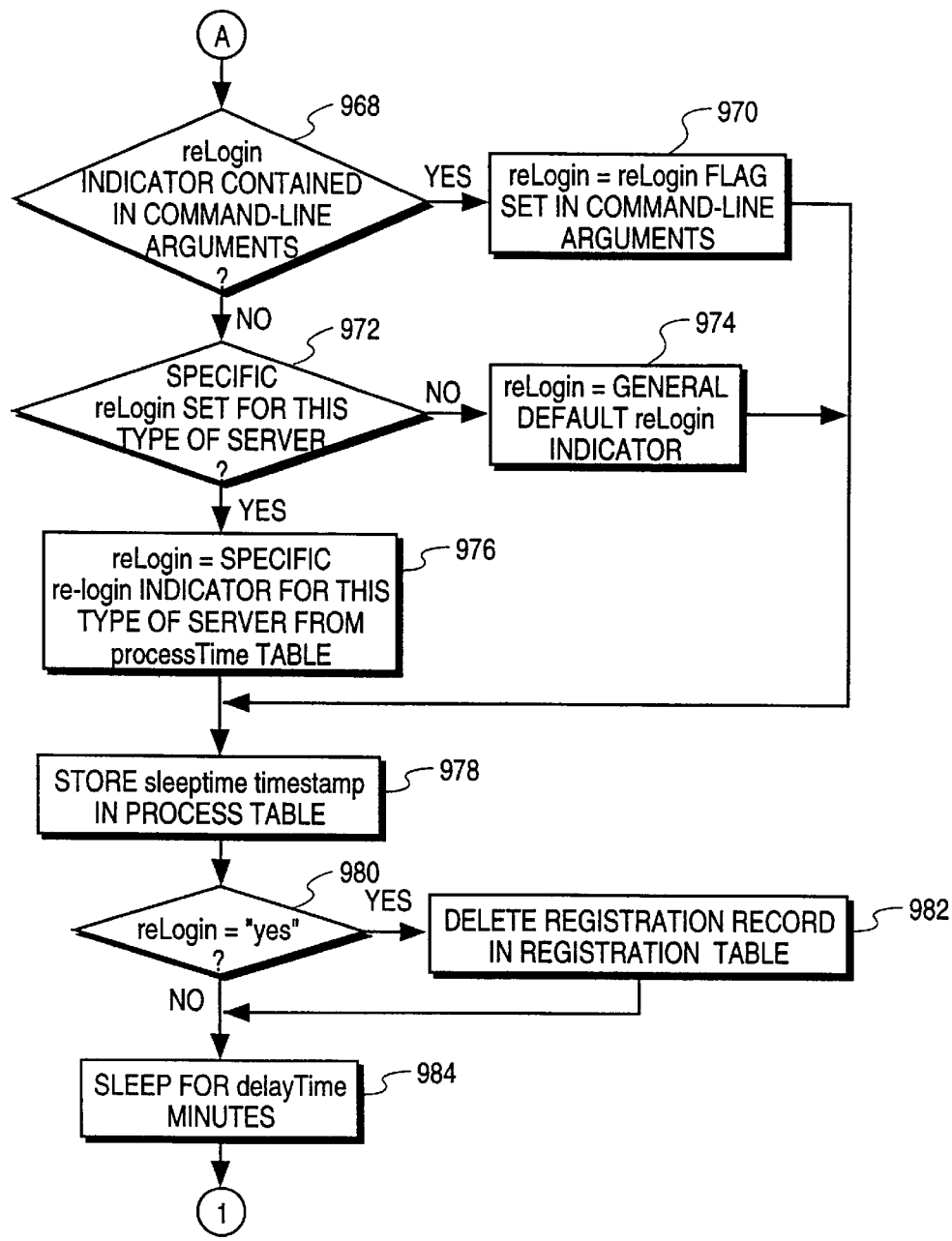

FIGS. 9C–9D illustrate the dormancy preparation for the postman process. At decision block 940 (i.e., "run multiple passes?"), if a process is not meant to run more than one pass, or cycle, processing continues at block 942 to set exitCode to "noRestart" and processing continues at block 926. If the process is configured to run multiple passes, processing continues at block 943. At block 943, a passCount is incremented by one. At decision block 944 (i.e., "passCount=number of passes desired?"), if the configured number of passes have been performed, processing continues at block 946 to set exitCode to "noRestart" and processing continues at block 926.

If the number of multiple cycles has not been achieved, processing continues at block 948 to invoke checkState. At decision block 950 (i.e., "system shutdown or restarted?"), if the system was shutdown or restarted-processing continues at block 952 to set the exitCode to "noRestart," and processing continues at block 926. If not, processing continues at decision block 954. At decision block 954 (i.e., "delay time contained in command-line arguments?"), if the delay time was passed to the process, processing continues at block 956 to assign the passed value to the delayTime variable, and processing continues at decision block 968.

If not, processing continues at decision block 958. At decision block 958 (i.e., "runFlag='Active'?"), if the flag indicates that the process is not meant to be active during this period, delayTime is set to the time remaining until it is to be active, and processing continues at decision block 968. If the flag indicates that the process is meant to be active, processing continues at decision block 962.

At decision block 962 (i.e., "specific delay time set for this server?"), if there is a delayTime value for this process, processing continues at block 966 to set the delayTime variable to this time. Processing continues at decision block 968. If not, a default delayTime is used at block 964, and processing continues at decision block 968.

At decision block 968 (i.e., "reLogin indicator contained in command-line arguments?"), if the indicator for logging back into the RDBMS was passed to the process, processing continues at block 970 to use the passed value to set the reLogin variable. Processing continues at block 978. If not, processing continues at decision block 972.

At decision block 972 (i.e., "specific reLogin indicator set for this type of server?"), if a specific reLogin value is set, this value is used to set the reLogin variable at block 976, and processing continues at block 978. If not, processing continues at block 974 to use a default for this class of process, and processing continues at block 978.

At block 978, the time at which the process becomes dormant (i.e., the sleepTime timestamp) is stored in the associated entry in the process table. At decision block 980 (i.e., reLogin="Yes"?), if reLogin is positive, registration of the process is deleted, and processing continues at block 984. If it is negative, processing continues at block 984. At block 984, the process becomes dormant for the number of minutes determined by the value of delayTime. After awaking, the process continues at block 910 to determine the state of the system.
Process Completion As previously indicated, a process can complete after one or more cycles, or upon some other indication. FIG. 9B illustrates a Postman process flow anticipating process completion. At block 926, work areas are freed. At decision block 928 (i.e., "connected to database?"), if the process is not connected to the database, processing continues at block 934. If it is, processing continues at block 930 to rollback any uncommitted transactions. Processing continues at block 934.

Figure 10:
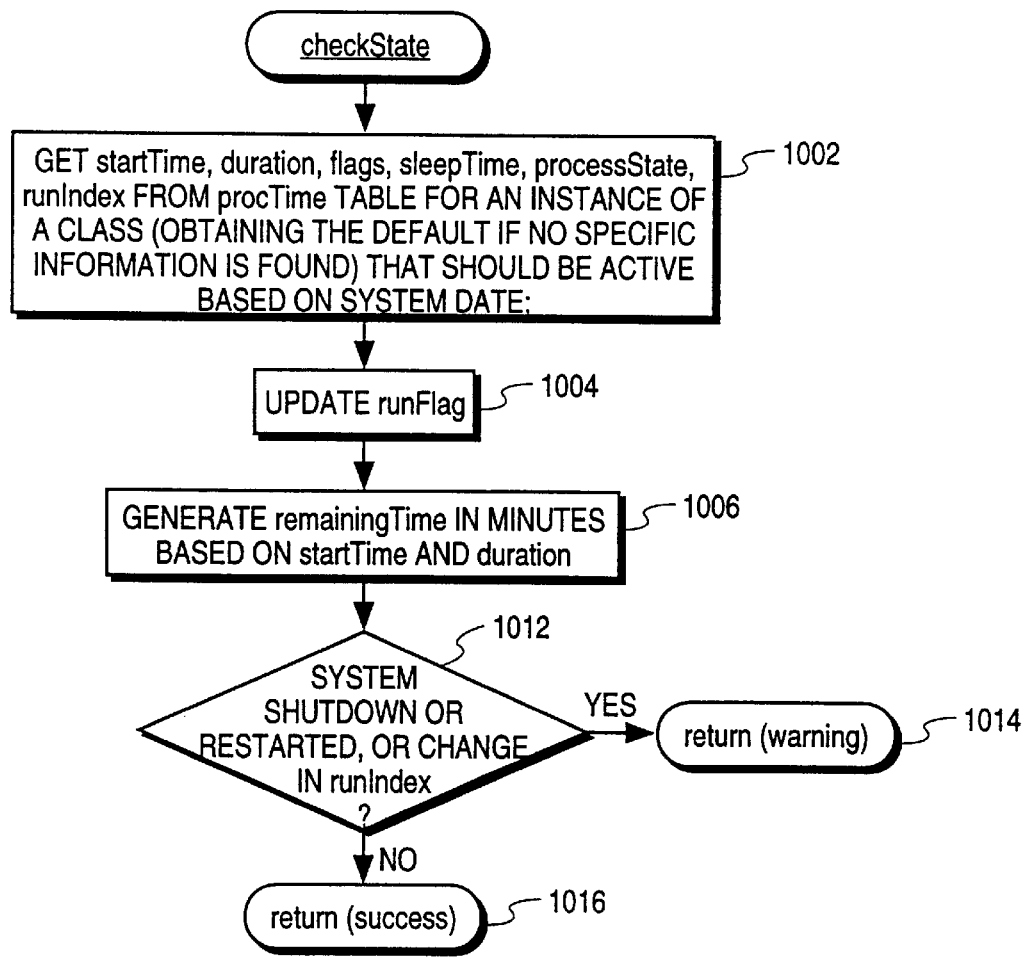
FIG. 10 provides an example of a checkState process flow.

At block 934, any space acquired during processing (e.g., contexts) is freed. Processing returns at block 936 to the invoking process with the value of exitCode. The exitCode value can be used by the invoking process (e.g., guardian) to determine whether or not this process is to be restarted.
checkState The checkState process checks the state of the system and a particular process. FIG. 10 provides an example of a checkState process flow. At block 1002, either specific or generic (where there are no specific values) startTime, duration, flags, sleepTime, processState, and runIndex values are obtained from the procTime table. At block 1004, runFlag variable is updated from the flags value. The remainingTime is determined from the startTime and duration values at block 1006. At decision block 1012 (i.e., "system shutdown or restarted, or change in runIndex?"), if the system has shutdown or been restarted or there has been a change in runIndex, processing returns a warning at block 1014. If not, processing returns a successful value at block 1016.

performServerAction

Figure 11:
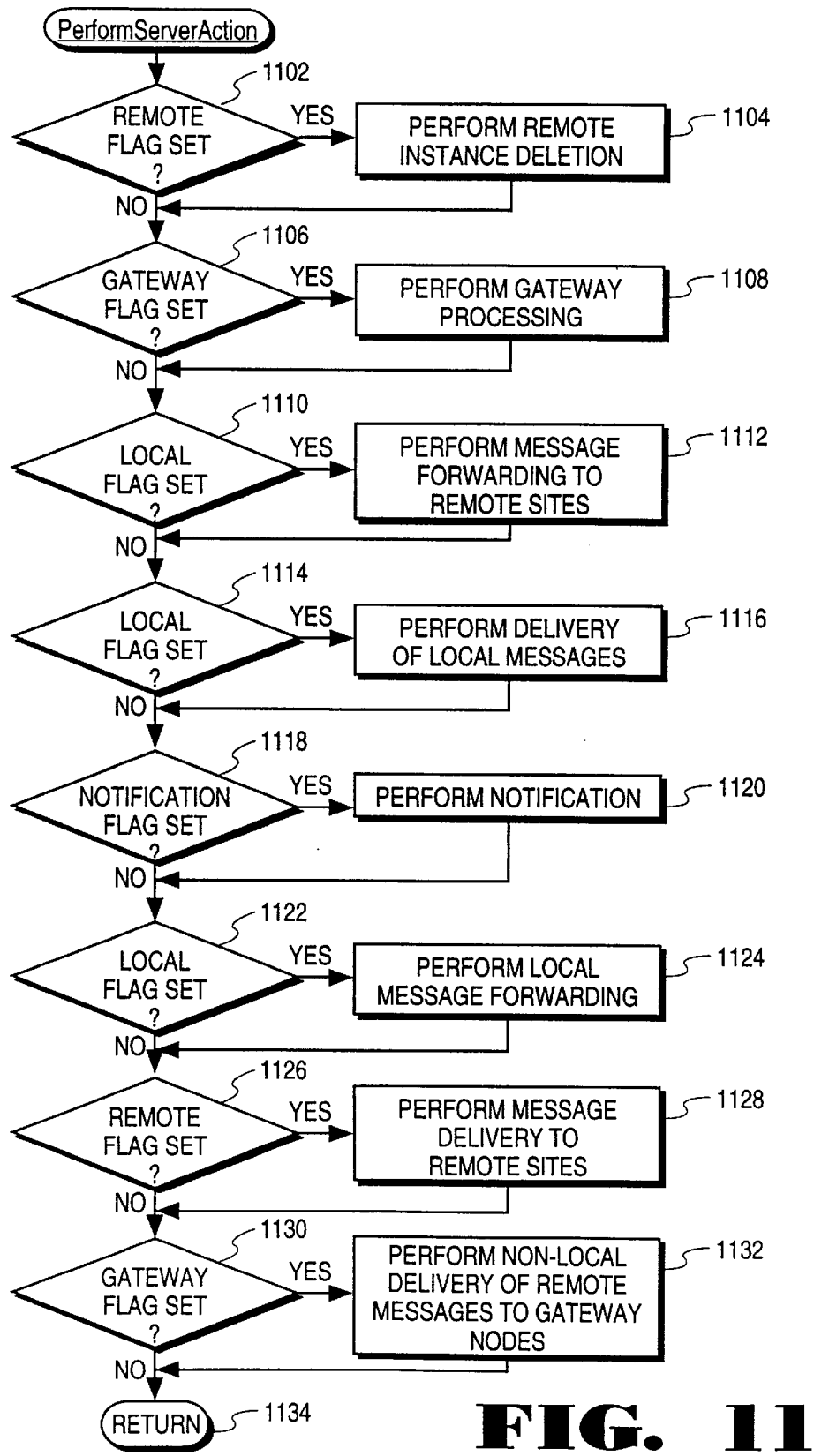
FIG. 11 illustrates a performServerAction process flow for a Postman process.

FIG. 11 illustrates a performServerAction process flow for a Postman process. At decision block 1102 (i.e., "remote flag set?"), if the remote flag is set, the Postman performs remote instance deletion at processing block 1104 and processing continues at decision block 1106. If not, processing continues at decision block 1106. At decision block 1106 (i.e., "gateway flag set?"), if the gateway flag is set, the Postman performs gateway processing at processing block 1108 and processing continues at decision block 1110. If not, processing continues at decision block 1110.

At decision block 1110 (i.e., "local flag set?"), if the local flag is set, the Postman performs message forwarding to remote sites at processing block 1112 and processing continues at decision block 1114. If not, processing continues at decision block 1114. At decision block 1114 (i.e., "local flag set?"), if the local flag is set, the Postman performs local message delivery at processing block 1116 and processing continues at decision block 1118. If not, processing continues at decision block 1118.

At decision block 1110 (i.e., "notification flag set?"), if the notification flag is set, the Postman performs notification at processing block 1120 and processing continues at decision block 1122. If not, processing continues at decision block 1122. At decision block 1122 (i.e., "local flag set?"), if the local flag is set, the Postman performs local message forwarding at processing block 1124 and processing continues at decision block 1124. If not, processing continues at decision block 1126.

At decision block 1126 (i.e., "remote flag set?"), if the remote flag is set, the Postman performs remote message delivery at processing block 1128 and processing continues at decision block 1130. If not, processing continues at decision block 1130. At decision block 1130 (i.e., "gateway flag set?"), if the gateway flag is set, the Postman performs non-local delivery of remote messages to gateway nodes at processing block 1132 and processing returns at decision block 1134. If not, processing returns at decision block 1134.

MAIL OBJECT LOCKING

To perform configured tasks, one or more processes must access records in a queue. In the preferred embodiment, queue entries can be stored in a database with each queue entry being a row in a database relation, or table (e.g., the instance table). As each entry is selected for processing, the row in the table that corresponds to the queue entry can be locked. Each process can examine a snapshot of the queue and attempt to access the next queue entry. If the entry is not locked, the entry can be selected for processing. If the entry is locked, the entry cannot be selected by a subsequent, inquiring process.

Figure 12:
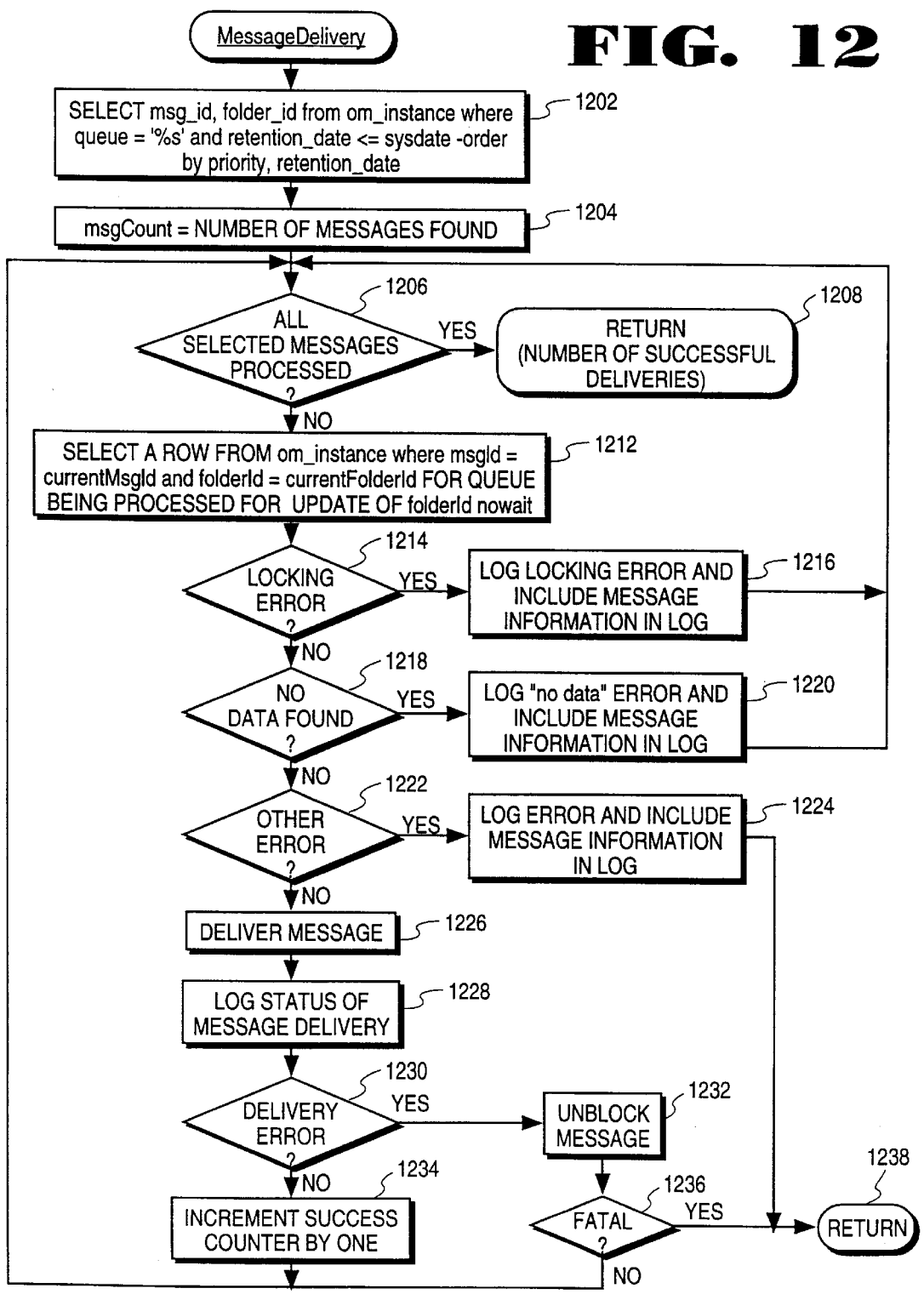
FIG. 12 illustrates a local message delivery process flow including locking.

FIG. 11 includes an example of a postman's local message delivery configurable task. FIG. 12 illustrates a local message delivery process flow including locking. At block 1202, message and folder identification is obtained from the instance table where the queue is a specified queue value and the retentionDate is less than or equal to the system date. The selected messages are ordered by priority and retentionDate.

The number of messages obtained is set in msgCount at processing block 1204. At decision block 1206 (i.e., "all selected messages processed?"), if all of the selected messages are processed, processing returns the number of successful deliveries at block 1208. If not, processing continues at block 1212 to select the next mail object from those selected. A selection for update causes the message to be locked from other access. Further, such a selection locks out subsequent attempts to access the record. Thus, at decision block 1214 (i.e., "locking error?"), if a locking error occurs, the process logs the error and processing continues at decision block 1206 to select another from any remaining messages.

If a locking error does not occur, processing continues at decision block 1218 to handle other exceptions. If it is determined that the message has already been delivered, processing continues at block 1220 to generate a log entry. Processing continues at decision block 1206 to process any remaining messages. If not, processing continues at decision block 1222 (i.e., "other error?"), if some other, unknown error occurs, processing returns at block 1238.

If no locking or other error occurs, processing continues at block 1226, to deliver the message. At block 1228, a log entry is generated to log the status of the delivery. At decision block 1230 (i.e., "delivery error?"), if a delivery error did not occur, processing continues at block 1234 to increment the successful delivery counter, and processing continues at decision block 1206. If a delivery error occurred, processing continues at block 1232 to unblock the message, and processing continues at decision block 1236.

At decision block 1236 (i.e., "fatal?"), if the error is a fatal error, processing returns at block 1238. If not, processing continues at decision block 1206 to process any remaining messages.

Thus, a method and apparatus for processing electronic mail in parallel has been provided.

What is claimed is:

1. A method for processing electronic mail objects in a data processing system, the method comprising:
   initiating processes to process electronic mail objects in parallel, wherein the number of the processes can be dynamically increased and decreased;
   assigning to a first process of the processes an initial unit of work associated with the electronic mail objects; and
   assigning to the first process an additional unit of work associated with the electronic mail objects after the initial unit of work has been assigned.

2. The method of claim 1 further comprising receiving the electronic mail objects in the data processing system, the additional unit of work being associated with one of the electronic mail objects received after said step of assigning an initial unit of work.

3. The method of claim 2 further comprising the first process commencing processing of the initial unit of work before the one of the electronic mail objects is received.

4. The method of claim 1 further comprising the step of terminating at least one of the processes in response to a decrease in the number of the electronic mail objects in the data processing system.

5. The method of claim 1 further comprising storing the electronic mail objects in a queue and wherein assigning to the first process an initial unit of work associated with the electronic mail objects comprises assigning the first process to the queue and the first process selecting a first mail object of the electronic mail objects in the queue.

6. The method of claim 2 wherein assigning to the first process an additional unit of work comprises the first process selecting a second mail object of the electronic mail objects in the queue.

7. An article of manufacture including one or more computer readable media having program code stored thereon, the program code including instructions which, when executed by one or more processors, cause the one or more processors to:
   initiate processes to process electronic mail objects in parallel, wherein the number of the processes can be dynamically increased and decreased;
   assign to a first process of the processes an initial unit of work associated with the electronic mail objects; and
   assign to the first process an additional unit of work associated with the electronic mail objects after the initial unit of work has been assigned.

8. The article of manufacture of claim 7 wherein the program code further includes instructions which, when executed by the one or more processors, cause the one or more processors to receive the electronic mail objects in the data processing system, the additional unit of work being associated with one of the electronic mail objects received after said step of assigning an initial unit of work.

9. The article of manufacture of claim 8 wherein the program code further includes instructions which, when executed by the one or more processors, cause the one or more processors to commence processing of the initial unit of work in the first process before the one of the electronic mail objects is received.

10. The article of manufacture of claim 7 wherein the program code further includes instructions which, when executed by the one or more processors, cause the one or more processors to terminate at least one of the processes in response to a decrease in the number of the electronic mail objects in the data processing system.

11. A data processing system comprising:
    a communication path; and
    one or more computers coupled to receive electronic mail objects from the communication path, the one or more of the computers being configured to:
      execute processes to process the electronic mail objects in parallel, wherein the number of the processes can be dynamically increased and decreased;
      assign to a first process of the processes an initial unit of work associated with the electronic mail objects; and
      assign to the first process an additional unit of work associated with the electronic mail objects after the initial unit of work has been assigned.

12. The data processing system of claim 11 wherein the additional unit of work is associated with one of the electronic mail objects received after said step of assigning an initial unit of work.

13. The data processing system of claim 12 wherein the first process commences processing of the initial unit of work before the one of the electronic mail objects is received.

14. The data processing system of claim 11 wherein the one or more computer systems are further configured to terminate at least one of the processes in response to a decrease in the number of the electronic mail objects in the data processing system.

* * * * *